United States Patent
Ano et al.

(10) Patent No.: US 10,283,029 B2
(45) Date of Patent: May 7, 2019

(54) DISPLAY DEVICE, AND METHOD OF CONTROLLING DISPLAY DEVICE

(71) Applicant: SEIKO EPSON CORPORATION, Tokyo (JP)

(72) Inventors: Takahiro Ano, Matsumoto (JP); Koichiro Ota, Omachi (JP); Kazuyoshi Kitabayashi, Azumino (JP); Kento Yamada, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/668,011

(22) Filed: Aug. 3, 2017

(65) Prior Publication Data

US 2018/0047322 A1 Feb. 15, 2018

(30) Foreign Application Priority Data

Aug. 12, 2016 (JP) .................................. 2016-158444

(51) Int. Cl.
| | |
|---|---|
| *G09G 3/02* | (2006.01) |
| *G09G 3/00* | (2006.01) |
| *G09G 3/20* | (2006.01) |
| *G06F 3/0488* | (2013.01) |
| *G06F 3/042* | (2006.01) |
| *G06F 3/03* | (2006.01) |

(52) U.S. Cl.
CPC ............ *G09G 3/02* (2013.01); *G06F 3/0425* (2013.01); *G06F 3/0488* (2013.01); *G09G 3/002* (2013.01); *G09G 3/2003* (2013.01); *G06F 3/0304* (2013.01); *G09G 2310/027* (2013.01); *G09G 2320/0247* (2013.01)

(58) Field of Classification Search
CPC ........................................................ G09G 3/02
USPC ........................................................ 358/1.18
See application file for complete search history.

(56) References Cited

U.S. PATENT DOCUMENTS

| | | | |
|---|---|---|---|
| 2004/0130568 A1 | 7/2004 | Nagano et al. | |
| 2004/0246229 A1* | 12/2004 | Yamada | G06F 3/0317 345/156 |
| 2010/0095241 A1 | 4/2010 | Nagano et al. | |
| 2013/0265228 A1* | 10/2013 | Tamura | G06F 3/033 345/157 |
| 2014/0115528 A1 | 4/2014 | Nagano et al. | |

(Continued)

FOREIGN PATENT DOCUMENTS

| | | |
|---|---|---|
| JP | 2004-54134 A | 2/2004 |
| JP | 2014-132427 A | 7/2014 |

*Primary Examiner* — Jacky X Zheng
(74) *Attorney, Agent, or Firm* — Oliff PLC

(57) ABSTRACT

A projector includes an image generation section adapted to generate a composite image including a first image based on a first image signal, a second image based on a second image signal, and a boundary line indicating a position to be a boundary between the first image and the second image, a projection section adapted to display the composite image generated by the image generation section on a screen, a position detection section adapted to detect a position of a pointing body with respect to the screen, and a control section adapted to make the image generation section generate a composite image with a boundary line moved based on the position of the pointing body detected by the position detection section.

13 Claims, 22 Drawing Sheets

(56) References Cited

U.S. PATENT DOCUMENTS

2014/0195953 A1 7/2014 Sakai et al.
2016/0018905 A1* 1/2016 Nagao ................... G06F 3/033
 345/157

* cited by examiner

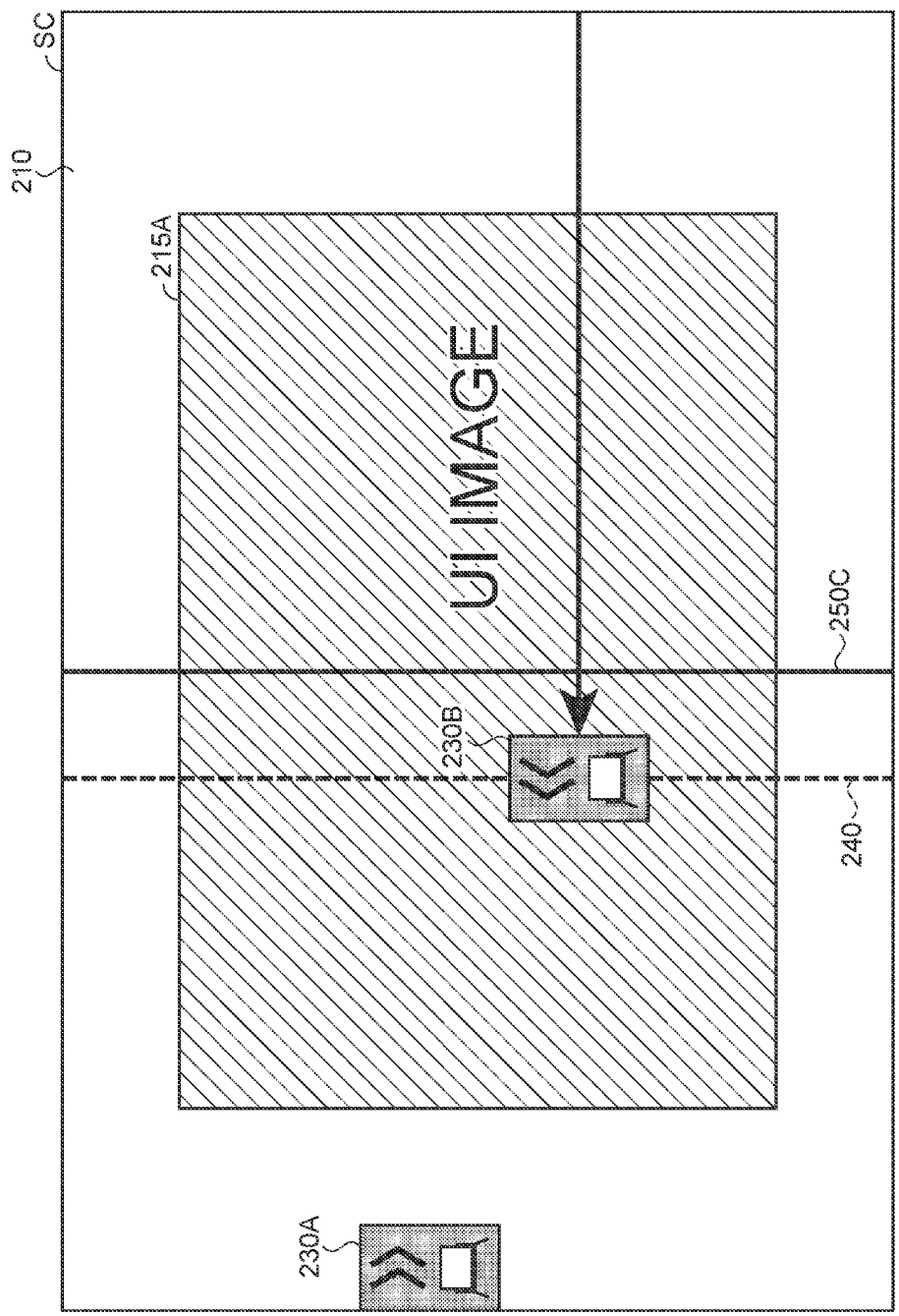

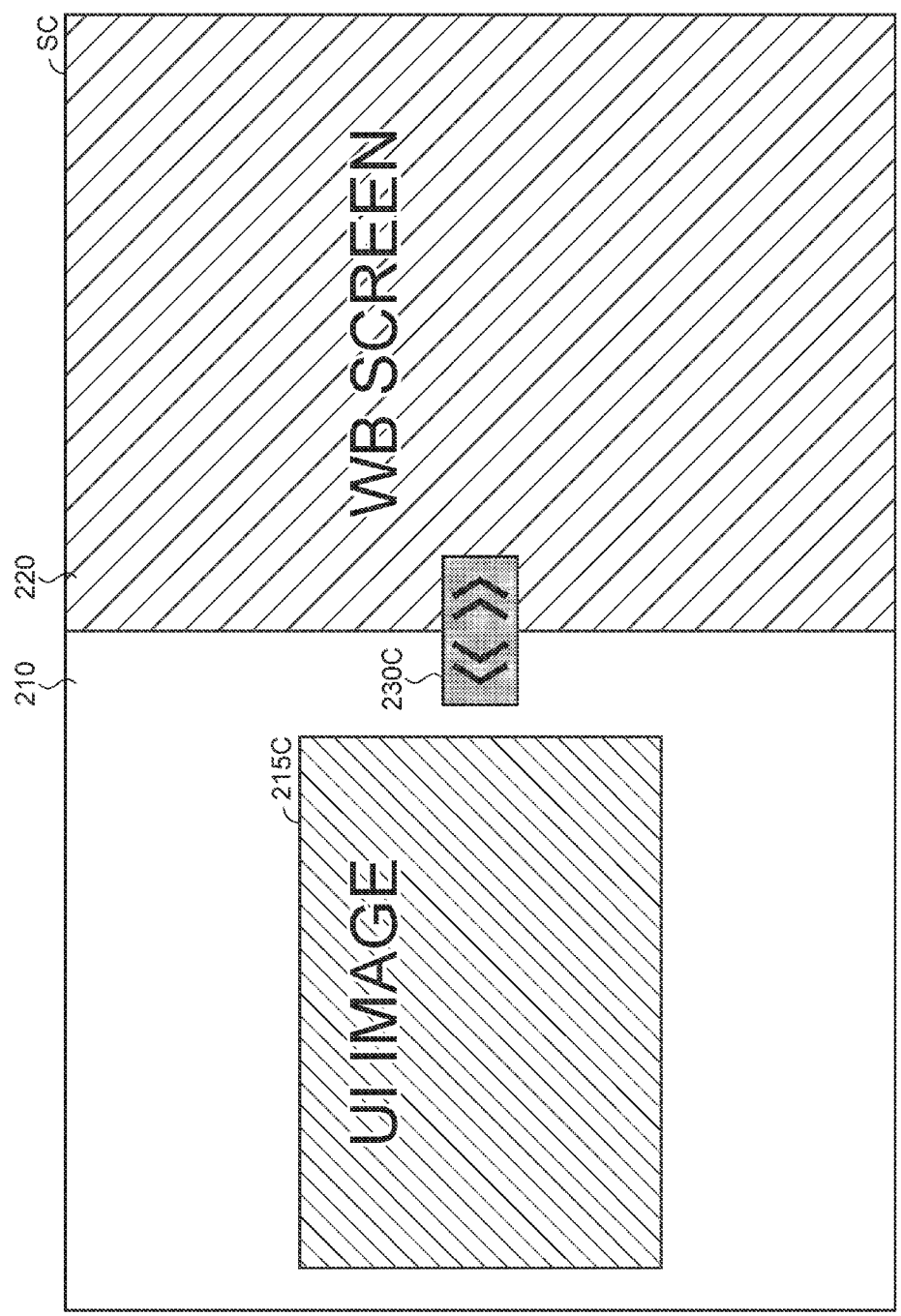

DISPLAY DEVICE, AND METHOD OF CONTROLLING DISPLAY DEVICE

CROSS-REFERENCE

The entire disclosure of Japanese Patent Application No. 2016-158444, filed Aug. 12, 2016 is expressly incorporated by reference herein.

BACKGROUND

1. Technical Field

The present invention relates to a display device and a method of controlling the display device.

2. Related Art

In the past, there has been known a projector, which modulates a light beam emitted from a light source to thereby form an image corresponding to image information, and project the image thus formed on a screen in an enlarged manner.

In recent years, as shown in JP-A-2004-54134, there is disclosed a projector, which receives image signals from a plurality of input sources to project a plurality of images corresponding to the plurality of image signals on a screen.

In the case of attempting to display an image, which the user focuses attention on out of the plurality of images projected by such a projector, on the screen so as to be larger in size than other images, the user sets the priority having been set to the image, on which the user focuses attention, to be higher than the priority of other images. Thus, the projector displays the image, on which the user focuses attention, so as to be larger in size than other images in accordance with the priorities and the numbers of the pixels of the images.

However, in the projector described above, although it is possible to display the image so as to be larger in size by raising the priority, since the size of the image to be displayed is determined in accordance with the priority and the number of pixels, it is unachievable for the user to explicitly designate the size of the image to be projected on the screen.

SUMMARY

An advantage of some aspects of the invention is to designate the desired size of an image to be projected in the case of projecting a plurality of images.

The invention can be implemented as the following forms or application examples.

Application Example 1

A display device according to this application example includes an image generation section adapted to generate a composite image including a first image based on a first image signal, a second image based on a second image signal, and a boundary line indicating a position to be a boundary between the first image and the second image, a display section adapted to display the composite image generated by the image generation section on a display surface, a detection section adapted to detect a position of a pointing body with respect to the display surface, and a control section adapted to make the image generation section generate the composite image with the boundary line moved based on the position of the pointing body detected by the detection section.

According to such a configuration, by moving the pointing body in the display surface on which the composite image including the first image based on the first image signal, the second image based on the second image signal and the boundary line indicating the position to be the boundary between the first image and the second image is projected, the composite image with the boundary line moved is generated and then projected. Therefore, the sizes of the first image and the second image can explicitly be designated by the move of the pointing body.

Application Example 2

In the display device according to the application example described above, it is preferable for the control section to make the image generation section generate the composite image added with an indication line at a division position the closest to the boundary line out of a plurality of division positions where the first image and the second image can be separated from each other in the composite image.

According to such a configuration, since the indication line is displayed at the position closest to the position of the pointing body out of the division positions where the first image and the second image can be separated from each other, it is possible to visually recognize the position where the two images can be separated with the sizes approximate to the desired sizes.

Application Example 3

In the display device according to the application example described above, it is preferable that in a case in which the control section makes the image generation section generate the composite image having a pointing area, which can be pointed by the pointing body, superimposed on the boundary, and then detect that the pointing area of the composite image displayed on the display surface is clicked by the pointing body, the control section makes the image generation section move the boundary line of the composite image to a first division position adjacent to the boundary out of the plurality of division positions.

According to such a configuration, by clicking the pointing area displayed so as to be superimposed on the boundary, it is possible to move the boundary line to the first division position adjacent to the division position corresponding to the indication line.

Application Example 4

In the display device according to the application example described above, it is preferable for the pointing area to be able to be moved along the boundary line.

According to such a configuration, since the pointing area can be moved along the indication line, it is possible to move the pointing area to a position where the visibility does not degrade in accordance with the image projected.

Application Example 5

In the display device according to the application example described above, it is preferable that in a case in which the first image signal is input from a first input source, the display section displays the first image on the display surface, and does not display the second image on the display surface, if the control section detects that the boundary line moves to a position other than an end part, the control section makes the image generation section generate the composite image, which includes the second image based on the second image signal input from the second input source different from the first input source, based on the boundary line moved.

According to such a configuration, in the case in which the display section displays the first image, but does not display the second image, the composite image further including the second image based on the second input source is generated based on the position of the boundary thus moved. Therefore, it is possible to generate the composite image obtained by combining the images based on the plurality of input sources based on the position of the indication line.

Application Example 6

In the display device according to the application example described above, it is preferable for the control section to perform a signal discrimination process on the second image signal without performing the signal discrimination process on the first image signal.

According to such a configuration, since the signal discrimination process is not performed on the first image signal, the first image generated based on the first image signal can be displayed without regenerating the first image.

Application Example 7

In the display device according to the application example described above, it is preferable that in a case in which the second input source can be selected from a plurality of sources including a first source and a second source, the control section makes the image generation section generate the composite image provided with a first pointing area corresponding to the first source and a second pointing area different from the first pointing area and corresponding to the second source.

According to such a configuration, it becomes easy to select the input source.

Application Example 8

In the display device according to the application example described above, it is preferable that in a case of disposing the second image in an area of the composite image where the first image has been disposed based on the boundary, the control section determines an area of the first image displayed in priority based on the information having been set.

According to such a configuration, in the case of disposing the second image in a partial area of the composite image where the first image has been disposed, there area of the first image to be displayed in priority can be set.

Application Example 9

A method of controlling a display device according to this application example includes generating a composite image including a first image based on a first image signal, a second image based on a second image signal, and a boundary line indicating a position to be a boundary between the first image and the second image, displaying the composite image having been generated on a display surface, detecting a position a pointing body with respect to the display surface, and generating the composite image with the boundary line moved based on the position of the pointing body having been detected.

According to such a method, by moving the pointing body in the display surface on which the composite image including the first image based on the first image signal, the second image based on the second image signal and the boundary line indicating the position to be the boundary between the first image and the second image is projected, the composite image with the boundary line moved is generated and then projected. Therefore, the sizes of the first image and the second image can explicitly be designated by the move of the pointing body.

BRIEF DESCRIPTION OF THE DRAWINGS

The invention will be described with reference to the accompanying drawings, wherein like numbers reference like elements.

FIG. 7D is a diagram showing move of the guide line in the first projection screen due to the external input mode.

FIG. 8B is a diagram showing an example of performing the dual-partitioning display with the same size.

DESCRIPTION OF AN EXEMPLARY EMBODIMENT

An embodiment of the invention will hereinafter be described with reference to the accompanying drawings.

Embodiment

Figure 1:
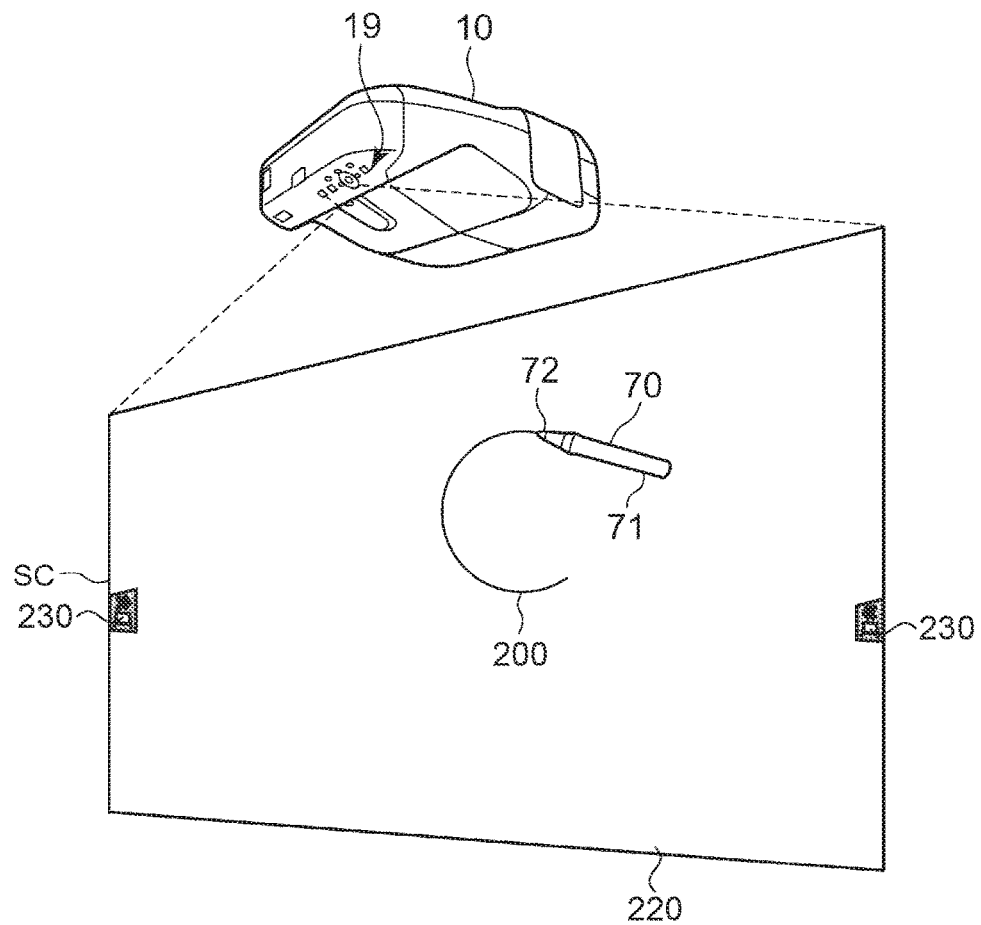
FIG. 1 is a diagram showing a usage example of a projector according to an embodiment of the invention.

FIG. 1 is a diagram showing a usage example of a projector 10 according to an embodiment to which the invention is applied. The projector 10 is one of display devices, and is of a short-focus type dispose immediately above the screen SC as a display surface, and for projecting an image obliquely downward. Further, the screen SC illustrated in the present embodiment is a flat plate or a curtain fixed to a wall surface, or erected on the floor surface. It should be noted that it is also possible to use the wall surface as the screen SC. In this case, it is also possible to attach the projector 10 to an upper part of the wall surface used as the screen SC.

The projector 10 is capable of projecting an image on the screen SC based on image data input from the outside as an external input mode.

Further, the projector 10 has a function (an interactive function) for a user (an operator) to instruct a predetermined operation using a pointing body 70 on the screen SC for projecting the image. The pointing body 70 is, for example, a pen-shaped input device, and the operator uses the input device while gripping a shaft part 71 so as to press the tip of the input device against the screen SC. The tip of the pointing body 70 is provided with an operation switch 72 for detecting the pressing operation, and in the case in which the operator presses the tip of the pointing body 70 against the screen SC, the operation switch 72 is set to the ON state. By pressing the tip of the pointing body 70 against the screen SC at an arbitrary position on the screen SC, it is possible for the operator to perform a position pointing operation.

As described later, the projector 10 is provided with a function of detecting the position of the pointing body 70 on the screen SC. It is possible for the projector 10 to detect the position where the tip of the pointing body 70 has contact with the screen SC as the operation position in the case in which the operator performs the position pointing operation, and then receive the position pointing operation performed by the operator with the pointing body 70 to reflect this operation on the projection image. Specifically, the projector 10 draws a drawing image 200 of a figure such as a straight line, a curved line, or a polygon, or a character based on a drawing operation by the user, namely an operation of the pointing body 70 held by the user moving in the state of being pressed against the screen SC, and then projects the drawing image 200 on the screen SC.

For example, the projector 10 has a function (a whiteboard (WB) function) of projecting a second projection image 220 on the screen SC with white light to make a state like a whiteboard, and at the same time drawing the drawing image 200 on the screen SC in the case in which no image is projected on the screen SC as shown in FIG. 1. The configuration of performing such a WB function is called a WB mode.

Further, the projector 10 has a function (an annotation function) capable of drawing the drawing image 200 superimposed on the projection image in the case in which some projection images are projected on the screen SC.

Further, as described later, in the case in which a two-screen button 230 projected on the screen SC is pointed by the pointing body 70, the projector 10 is capable of dividing the area projected on the screen SC into two, and projecting images of respective modes different from each other, e.g., the WB mode and an external input mode, in the respective areas thus divided at the same time.

Further, the projector 10 is capable of storing the image drawn on the screen SC as image data. In this case, it is possible to store only the drawing image 200 as the image data, or it is also possible to store an image obtained by superimposing the projection image, which has been projected on the screen SC at the time of drawing, and the drawing image 200 on each other as the image data.

The projector 10 is provided with an operation panel 19 disposed on an exterior housing. The operation panel 19 has a variety of switches and indicator lamps, and the indicator lamps light or blink in accordance with the operation state and the setting state of the projector 10.

Figure 2:
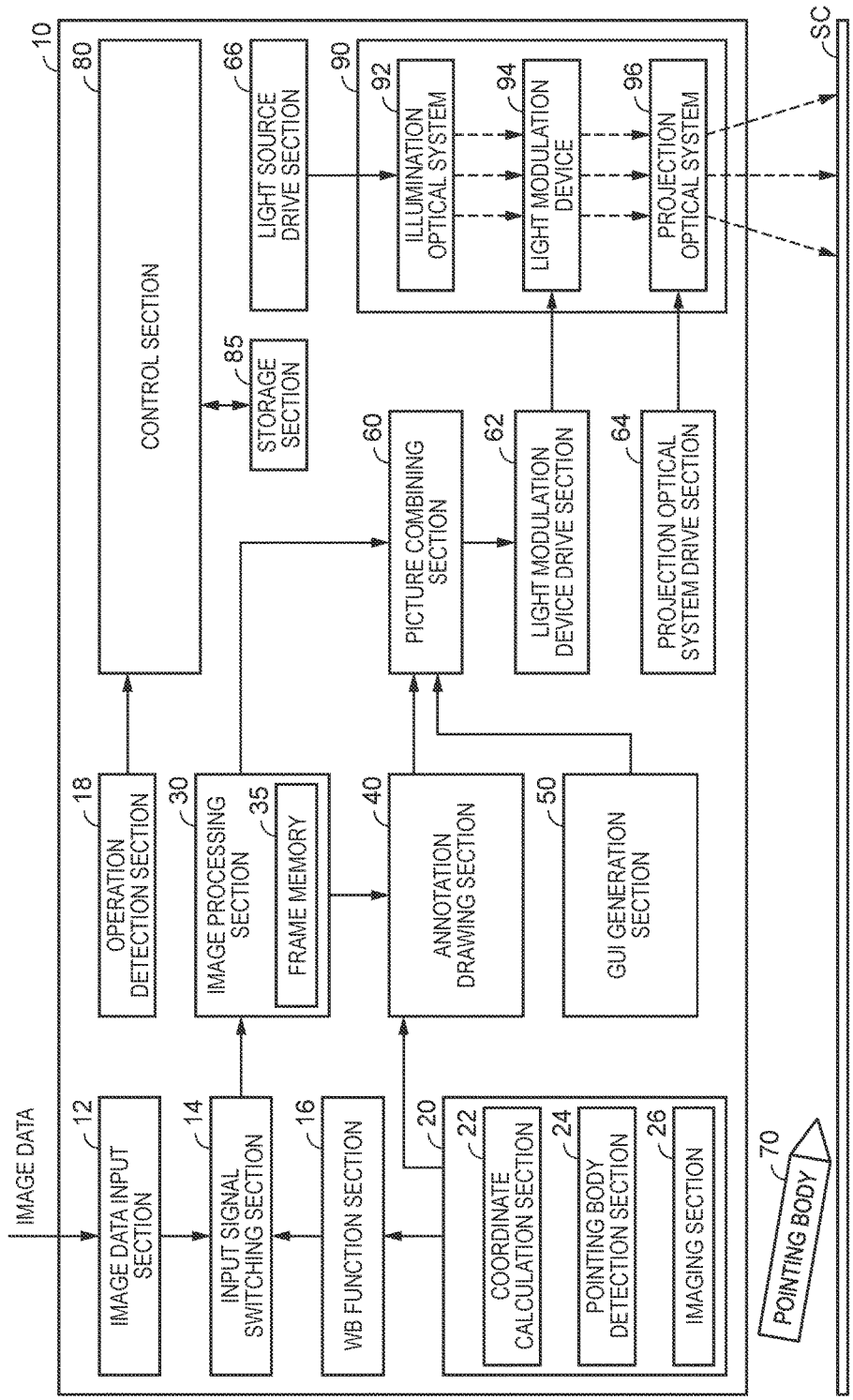
FIG. 2 is a functional block diagram showing a configuration of the projector according to the embodiment.

FIG. 2 is a functional block diagram of sections constituting the projector 10.

The projector 10 is provided with an image data input section 12 to which the image data is input.

The image data input section 12 can also be, for example, a USB interface, or a communication interface such as wired or wireless LAN interface. For example, it is also possible for a computer system or other projectors as an input source to be connected via a LAN interface provided to the image data input section 12.

It is also possible for the image data input section 12 to be provided with an input terminal to which an analog video signal or a digital video signal is input. The input terminal is a VGA terminal, a DVI (Digital Visual Interface), an S-video terminal, an RCA terminal, a D-terminal, an HDMI connector compliant with the HDMI (registered trademark) standard or the like. It is also possible for the image data input section 12 to be provided with an interface circuit or an image processing circuit corresponding to such an input terminal.

Further, the image data input section 12 can also be provided with a reading function of reading the image data stored in a flash memory or the like. The image signal (a first image signal) input to the image data input section 12 is transmitted to an image processing section 30 via a input signal switching section 14.

Further, the projector 10 is provided with a position detection section 20 for detecting the position of the pointing body 70 relatively to the screen SC. The position detection section (detection section) 20 is configured including an imaging section 26, a pointing body detection section 24, and a coordinate calculation section 22.

The imaging section 26 has an imaging optical system, an imaging element, an interface circuit, and so on, and shoots the projection direction of the projection optical system 96. The imaging optical system of the imaging section 26 is disposed so as to face to the same direction as the projection optical system 96, and has a field angle of covering the range in which the projection optical system 96 projects the image on the screen SC. Further, as the imaging element, there can be cited CCD and CMOS. The interface circuit reads out and then outputs the detection value of the imaging element.

The imaging section 26 shoots the pointing body 70 operated on the screen SC or in the vicinity of the screen SC together with the image projected on the screen SC. The imaging element of the imaging section 26 can be one having sensitivity in a wavelength band of the visible light, or can also have sensitivity in a wavelength band of the infrared light or a wavelength band of the infrared light and the visible light. In the present embodiment, the imaging section 26 outputs shot image data of the infrared light.

The pointing body detection section 24 detects the position of the pointing body 70 based on the shot image data output by the imaging section 26. The pointing body detection section 24 performs a process of detecting a shape similar to the pointing body 70 from the shot image data to cut out the image of the pointing body 70, and then identifies the position of the pointing body 70 in the shot image data.

Here, it is also possible for the pointing body detection section 24 to identify the direction to which the tip of the pointing body 70 faces. It should be noted that the detection method of the pointing body 70 is not limited to the method of detecting the shape similar to the pointing body 70, but it is also possible to assume a detection method of the reflected light due to a light curtain.

It is possible for the detection method of the reflected light by the light curtain to, for example, emit detection light (e.g., infrared light) having a layered shape (or a curtain shape) throughout the entire surface of the screen SC, then shoot the reflected light reflected by the pointing body 70 having a region reflecting the infrared light, and then detect the position of the pointing body 70 based on the position of the reflected light in the shot image. The details of the detection method of the reflected light due to the light curtain are not an essential part of the invention, and are therefore omitted (regarding this method, see, e.g., JP-A-2015-159523).

The coordinate calculation section 22 calculates the coordinate of the position pointed by the tip of the pointing body 70 on the screen SC, namely the coordinate of the operation position, based on the position of the pointing body 70 in the shot image data identified by the pointing body detection section 24. Specifically, the coordinate calculation section 22 calculates the coordinate with reference to the area (projection area) in which a projection section 90 projects the image on the screen SC based on the operation position in the shot image data. The coordinate calculation section 22 outputs the data representing the coordinate of the operation position this calculated, the operation state of the operation switch 72, and so on to the WB function section 16, the annotation drawing section 40, and a control section 80.

The WB function section 16 projects the white light on the screen SC like a so-called whiteboard in the WB mode, and at the same time, generates the drawing image 200 on the screen SC based on the move operation of the pointing body 70. In the present embodiment, as the WB function section 16, there is assumed a configuration in which the hardware and the software for realizing the function are independent in the projector 10. The image signal (the second image signal) of the drawing image 200 generated by the WB function section 16 is transmitted to the image processing section 30 via the input signal switching section 14.

The input signal switching section 14 switches the input source of the image signal to be processed by the image processing section 30 based on an instruction of the control section 80. In the present embodiment, the input signal switching section 14 selects the image data from the image signal generated by the WB function section 16 and the image signals input to the image data input section 12 based on an instruction of the control section 80, and then transmits the image data thus selected to the image processing section 30.

The projector 10 can generally be divided into the projection section 90 for forming an optical image, and an image processing system for processing the image data.

The projection section 90 is configured including an illumination optical system 92, a light modulation device 94, and a projection optical system 96. The projection section 90 corresponds to a display section for displaying an image on a display surface.

The illumination optical system 92 is provided with a light source formed of a xenon lamp, a super-high pressure mercury lamp, a light emitting diode (LED), a laser source, or the like. Further, the illumination optical system 92 can also be provided with a reflector and an auxiliary reflector for guiding the light emitted by the light source to the light modulation device 94. Further, there can also be provided a lens group (not shown) for enhancing the optical characteristics of the projection light, a polarization plate, a dimming element for reducing the light intensity of the light emitted by the light source on a path leading to the light modulation device 94, and so on.

The light modulation device 94 is provided with, for example, three transmissive liquid crystal panels corresponding respectively to the three primary colors of RGB, and modulates the light transmitted through the liquid crystal panels to thereby generate the image light. The light from the illumination optical system 92 is separated into colored light beams of three colors of RGB, and the colored light beams enter the corresponding liquid crystal panels, respectively. The colored light beams, which have been modulated while passing through the respective liquid crystal panels, are combined by a combining optical system such as a cross dichroic prism, and are then output to the projection optical system 96.

The projection optical system 96 is provided with, for example, a zoom lens for performing expansion and contraction of the image to be projected and adjustment of the focus, a zoom controlling motor for controlling the level of the zoom, a focus adjusting motor for performing the focus adjustment, and a concave mirror for reflecting the projection light toward the screen SC. The projection optical system 96 performs the zoom adjustment and the focus adjustment of the image light having been modulated by the light modulation device 94, then guides the light having passed through the zoom lens toward the screen SC with the concave mirror, and then focus the light on the screen SC. To the projection section 90, there are connected a projection optical system drive section 64 for driving the respective motors provided to the projection optical system 96 in accordance with the control of the control section 80, and a light source drive section 66 for driving the light source provided to the illumination optical system 92 in accordance with the control of the control section 80. It should be noted that the specific configuration of the projection optical system 96 is not limited to the example described above, and it is also possible to project and then focus the light, which has been modulated by the light modulation device 94, on the screen SC by a lens using a configuration without using a mirror including the concave mirror.

On the other hand, the image processing system is provided with a storage section 85, an operation detection section 18, the image processing section 30, the annotation drawing section 40, a GUI generation section 50, a picture combining section 60, and a light modulation device drive section 62 centered on the control section 80 for controlling the whole of the projector 10.

The storage section 85 stores a control program executed by the control section 80 and data processed by the functional sections such as the control section 80.

The operation detection section 18 detects the operation instruction transmitted from the operation panel 19 or a remote controller (not shown), and then transmits the information of the operation instruction thus detected to the control section 80.

The image processing section 30 processes the image signal generated by the WB function transmitted via the input signal switching section 14 and the image signals input to the image data input section 12.

The image processing section 30 arbitrarily performs a variety of conversion processes such as an interlace/progressive conversion, a resolution conversion, and a color conversion on the image signal input, then generates the image data having a predetermined format, and then develops the image in the frame memory 35 frame by frame. The image data developed in the frame memory 35 is output to the picture combining section 60.

The annotation drawing section 40 has a function of drawing an image object, which has been drawn by the pointing body 70, so as to be superimposed on the image based on the image data input. For example, in the case in which the computer system is the input source (a first input source), the annotation drawing section 40 draws a line, a figure (annotation) and so on so as to be superimposed on the window displayed by an application program executed by the computer system. The image data, to which the image object is added by the annotation drawing section 40, is output to the picture combining section 60.

The GUI generation section 50 generates a GUI (Graphical User Interface) to be projected on the screen SC. For example, in the case in which the projector 10 is projecting an image based on the image data supplied from one of the input sources (second input sources) as the WB mode or the external input mode, the GUI generation section 50 generates the two-screen button 230 as a pointing area (the GUI image) with which dual-partitioning display using a plurality of input sources can be pointed by the pointing body 70. The image data of the two-screen button 230 thus generated is output to the picture combining section 60.

The picture combining section 60 generates the image data of a composite image obtained by combining the image data transmitted from the annotation drawing section 40 and the image data transmitted from the GUI generation section 50 with each other using the image data of each frame transmitted from the image processing section 30 as a base. The image data thus generated is output to the light modulation device drive section 62.

The image processing section 30 described above, the annotation drawing section 40, the GUI generation section 50, and the picture combining section 60 correspond to an image generation section for combining a plurality of images with each other to generate the composite image.

It should be noted that it is also possible for the control section 80 to perform the keystone distortion correction or the pin-cushion distortion correction on the image data generated by the picture combining section 60.

The light modulation device drive section 62 drives the light modulation device 94 to perform drawing based on the image data output from the picture combining section 60.

Figure 3:
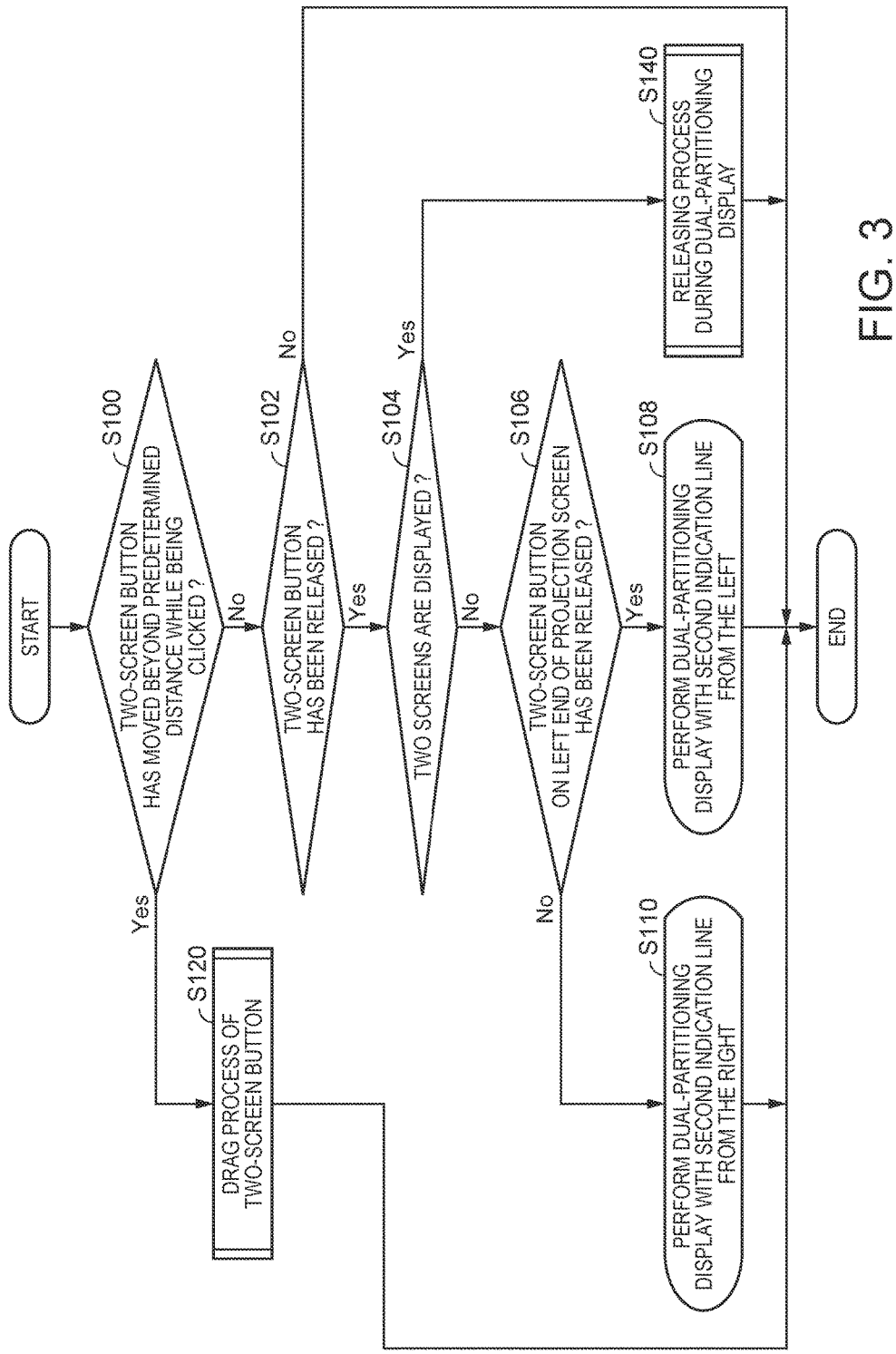
FIG. 3 is a flowchart showing the flow of a process of dual-partitioning display.
Figure 4:
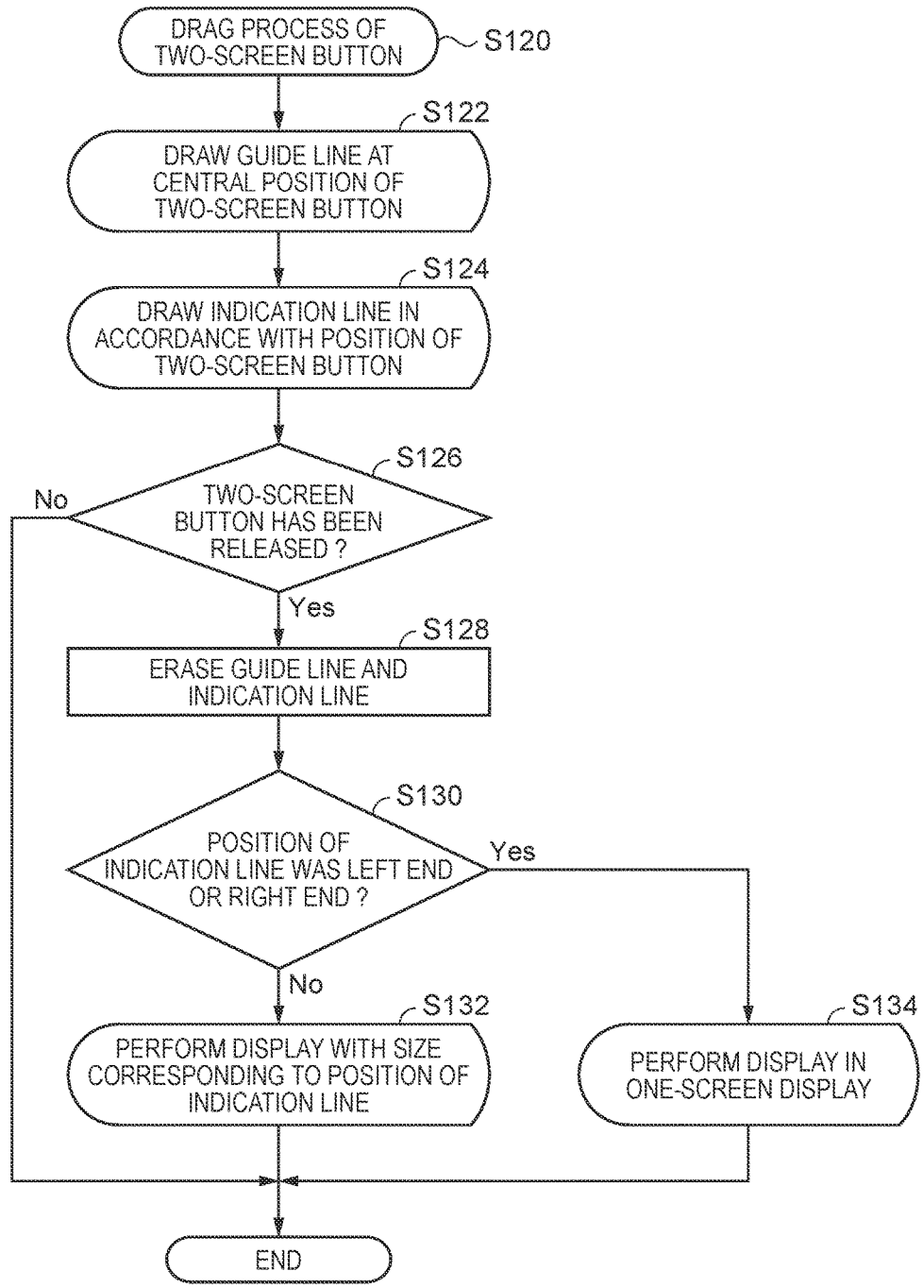
FIG. 4 is a flowchart showing the flow of a drag process of a two-screen button.
Figure 5:
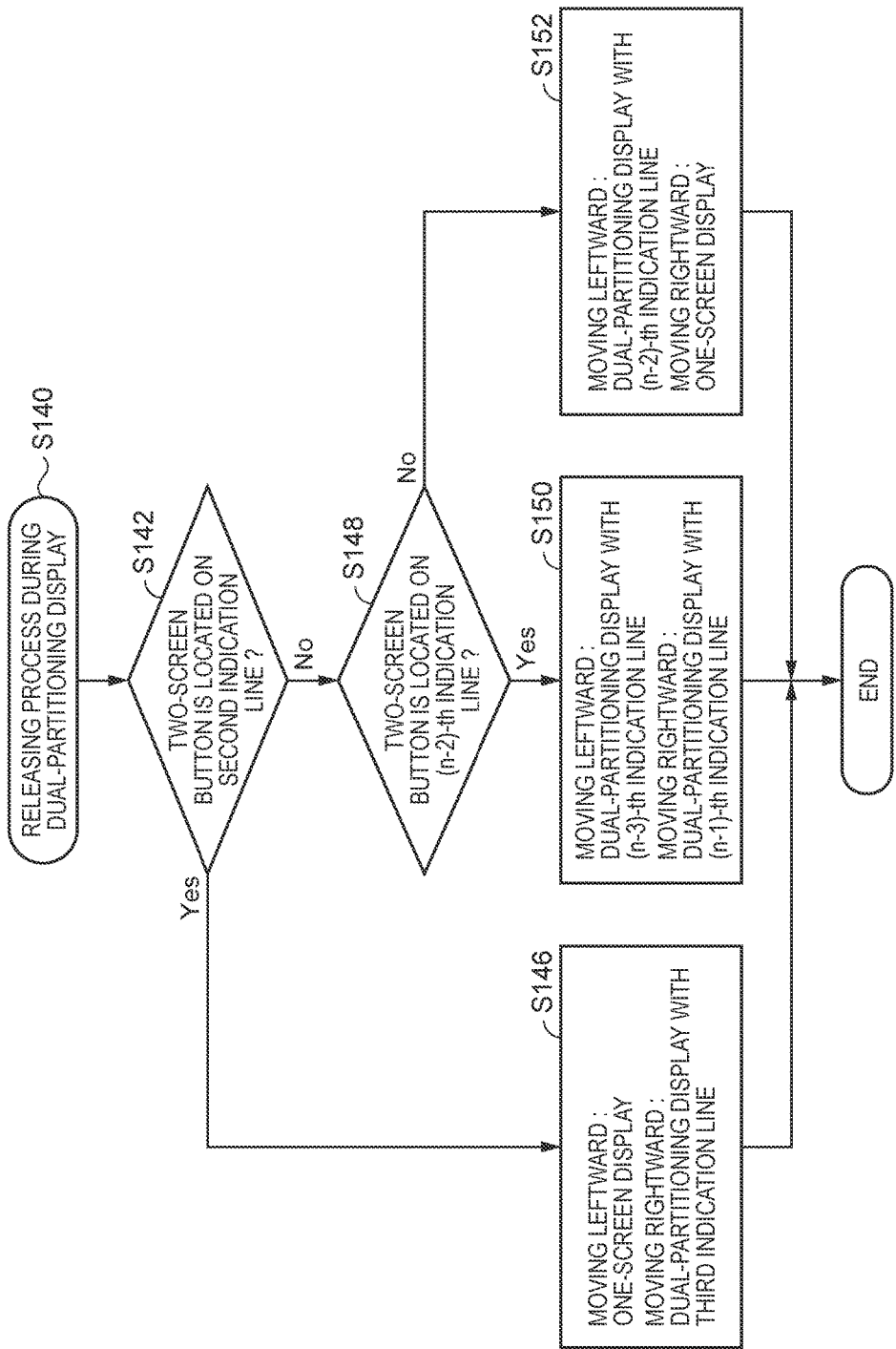
FIG. 5 is a flowchart showing the flow of the process of dual-partitioning display.

Then, FIG. 3 through FIG. 5 are flowcharts showing the flow of a process (a control method) of the dual-partitioning display. It should be noted that in order to make the process of the dual-partitioning display easy to understand, the explanation will be presented arbitrarily referring to FIG. 6, FIG. 7A through FIG. 7F, FIG. 8A through FIG. 8D, and FIG. 9A through FIG. 9C.

Figure 7A:
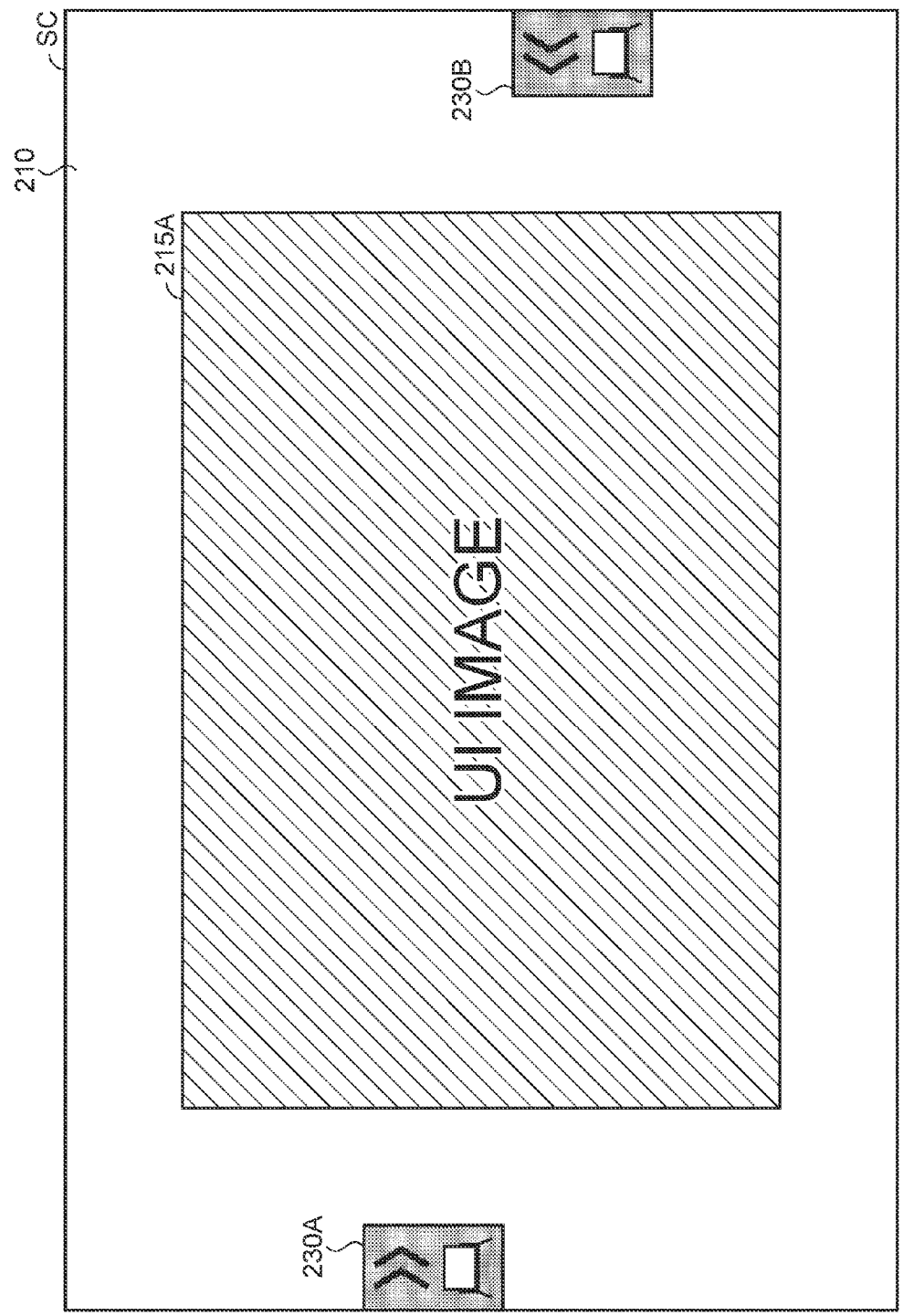
FIG. 7A is a diagram showing a first projection screen due to an external input mode.

There is assumed the state that, for example, as shown in FIG. 7A, a first projection screen 210 including a UI image 215A is projected on the screen SC, a first two-screen button 230A is included in a left end part of the first projection screen 210, and a second two-screen button 230B is included in a right end part of the first projection screen 210. The first projection screen 210 shown in FIG. 7A is a screen obtained by projecting the image (the first image) generated based on the image signal (the first image signal) output by the computer system as the external input mode on the screen SC. Here, the second projection screen 220 as the image (the second image) generated based on the image signal (the second image signal) output by the WB function section 16 is not displayed.

In such a state, in the case in which the pointing body 70 operated by the operator clicks the two-screen button 230 (the first two-screen button 230A, the second two-screen button 230B) projected on the screen SC, the process of the dual-partitioning display is performed.

If this process is performed, firstly, the control section 80 determines (step S100) whether or not the two-screen button 230 has moved beyond a predetermined distance while being clicked.

Here, in the case in which it has been determined that the two-screen button 230 has moved beyond the predetermined distance while being clicked (Yes in the step S100), a drag process (step S120) of the two-screen button 230 is performed, and then the process is terminated. It should be noted that the details of the drag process (step S120) of the two-screen button 230 will be described later.

On the other hand, in the case in which it has been determined that the two-screen button 230 has not moved beyond the predetermined distance while being clicked (No in the step S100), the control section 80 determines (step S102) whether or not the two-screen button 230 once clicked has been released (dropped).

Here, in the case in which it has been determined that the two-screen button 230 once clicked has not been released (No in the step S102), the process is terminated.

On the other hand, it has been determined that the two-screen button 230 once clicked has been released (Yes in the step S102), the control section 80 determines (step S104) whether or not two screens are projected and displayed on the screen SC in the present state.

Here, in the case in which it has been determined that the two screens are projected and displayed on the screen SC in the present state (Yes in the step S104), a releasing process (step S140) during the dual-partitioning display is performed, and then the process is terminated. It should be noted that the details of the releasing process (step S140) during the dual-partitioning display will be described later.

On the other hand, in the case in which it has been determined that the two screens are not projected on the screen SC in the present state (No in the step S104), the control section 80 determines (step S106) whether or not the first two-screen button 230A projected on the left end has been released.

Here, in the case in which it has been determined that the first two-screen button 230A has been released (Yes in the step S106), the control section 80 displays (step S108) the two screens (FIG. 8C) using an indication line 250D (FIG. 6) assumed in the second one from the left of a plurality of indication lines 250 as a boundary, and then terminates the process.

On the other hand, in the case in which it has been determined that the second two-screen button 230B has been released (No in the step S106), the control section 80 displays (step S110) the two screens (FIG. 8A) using an indication line 250B (FIG. 6) assumed in the second one from the right of the plurality of indication lines 250 as a boundary, and then terminates the process.

Here, the indication lines 250 will be described with reference to FIG. 6.

Figure 6:
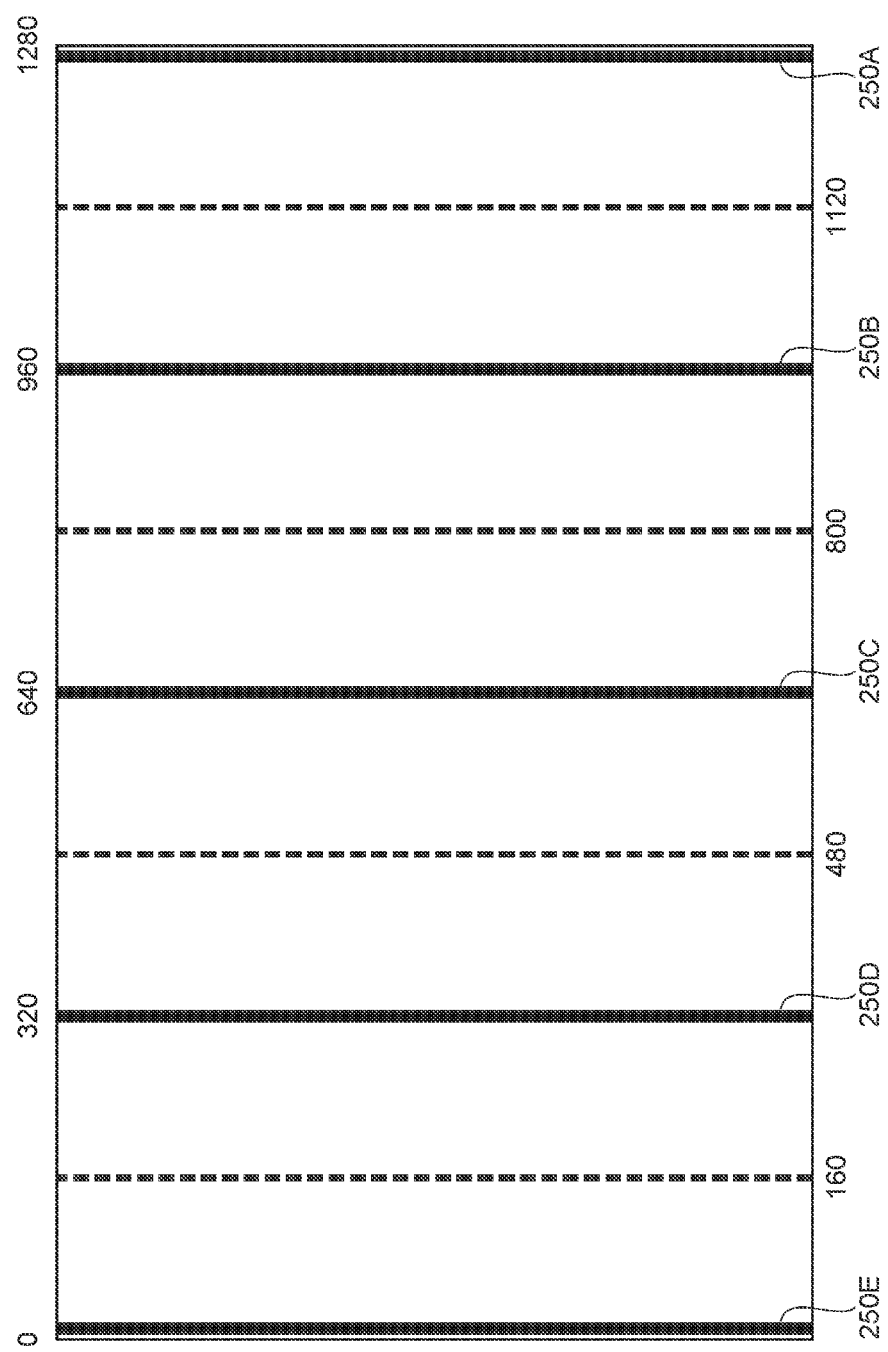
FIG. 6 is a diagram showing positions of a plurality of indication lines.

FIG. 6 is a diagram showing positions of the plurality of indication lines 250. In the present embodiment, it is assumed that the number of pixels constituting the screen is 1280 in the horizontal direction and 800 in the vertical direction, and there are three division sizes of the two screens, namely right-expansion, the same size, and left-expansion, but the sizes of the screens and the number of pixels are not limited. It should be noted that the number of the indication lines 250 is a number obtained by adding 2 (corresponding to the both ends) to the division number.

In the present embodiment, the left end of the screen projected is defined as the origin, and the position of the right end is defined as 1280. Further, the position Mn representing the n-th one (it should be noted that n is a natural number equal to or larger than 1, and in the range of no higher than (division number)+2) from the origin side of the indication lines 250 is expressed as Formula (1). The position Mn represents the division positions where the two projection screens can be separated.

$$Mn=\text{(horizontal width of the panel)} \times (n-1)/((\text{division number})+1) \quad (1)$$

Therefore, according to Formula (1), the first indication line 250E corresponds to the origin. Similarly, the position of the second indication line 250D is 320, the position of the third indication line 250C is 640, the position of the fourth indication line 250B is 960, and the position of the fifth indication line 250A is 1280.

Further, the switching range R for switching to the adjacent one of the indication lines 250 is expressed as Formula (2).

$$R=\text{(horizontal width of the panel)} \times 0.5/((\text{division number})+1) \quad (2)$$

Therefore, in the present embodiment, the switching range R is 160. By applying the switching range R to FIG. 6, branching positions of the respective indication lines 250 are 160, 480, 800, and 1120, respectively.

Further, in the present embodiment, the relationship between the position PX of the two-screen button 230 and the indication lines 250 displayed is as expressed as Formula (3).

$$(Mn-R) \leq PX < (Mn+R) \quad (3)$$

Therefore, in the case in which the position PX of the two-screen button 230 is within the range expressed by Formula (3), the control section 80 displays the n-th one from the origin side of the indication lines 250.

Figure 8A:
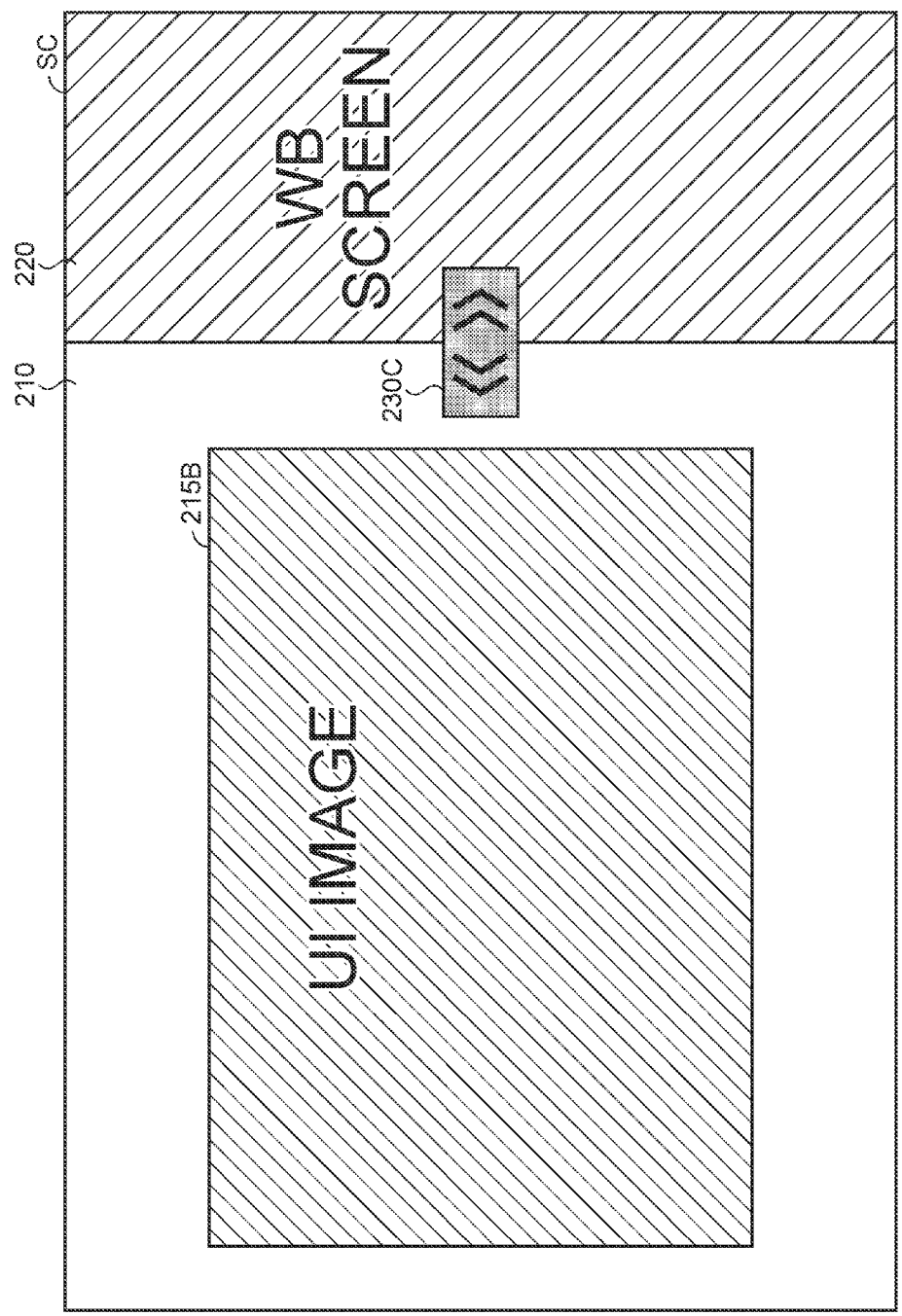
FIG. 8A is a diagram showing an example of performing the dual-partitioning display with a size of left-expansion.
Figure 8C:
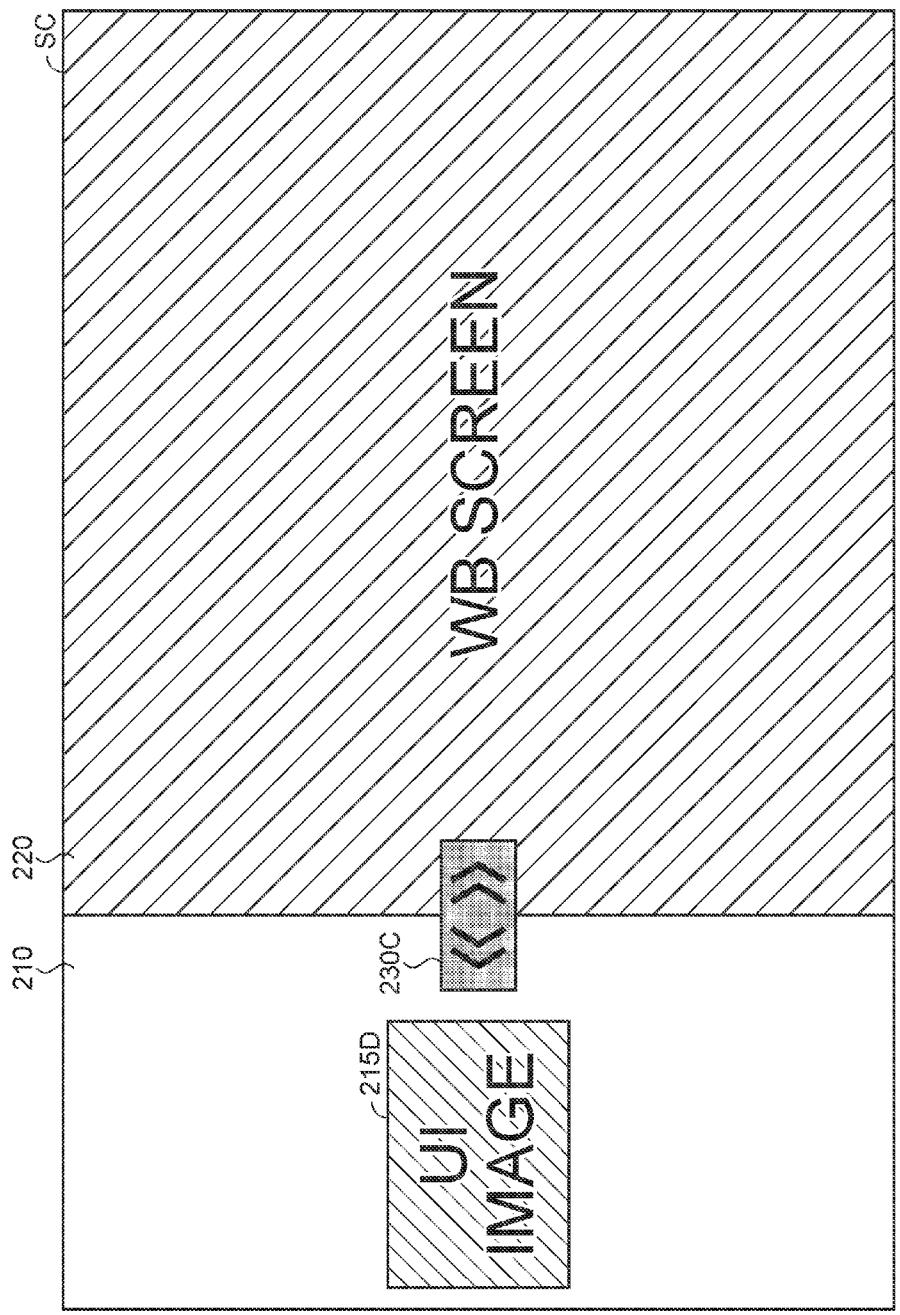
FIG. 8C is a diagram showing an example of performing the dual-partitioning display with a size of right-expansion.

In accordance with the above description, in the step S108, the dual-partitioning display is performed so that the position of the second indication line 250D becomes the boundary as shown in FIG. 8C.

The control section 80 generates the UI image 215D based on the size of the first projection screen 210 in the external input mode, and then projects the UI image 215D thus generated on the screen SC. Further, the control section 80 projects the area, which can be drawn in the WB mode, on the screen SC with the size of the second projection screen 220 and a white color.

Further, the control section 80 projects a third two-screen button 230C generated by the GUI generation section 50 at the boundary position between the first projection screen 210 and the second projection screen 220. It should be noted that the third two-screen button 230C can be clicked and dragged in the horizontal direction with the pointing body 70 similarly to the first two-screen button 230A and the second two-screen button 230B. Further, the third two-screen button 230C is generated so that whether the part clicked is located on the right side or the left side of the third two-screen button 230C can be recognized.

Similarly, in the step S110, the dual-partitioning display is performed so that the position of the fourth indication line 250B becomes the boundary as shown in FIG. 8A.

The control section 80 generates the UI image 215B based on the size of the first projection screen 210 in the external input mode, and then projects the UI image 215B thus generated on the screen SC. Further, the control section 80 projects the area, which can be drawn in the WB mode, on the screen SC with the size of the second projection screen 220 and a white color.

FIG. 4 is a flowchart showing the flow of the drag process (step S120) of the two-screen button 230.

It should be noted that in the following description, there is assumed the state in which the pointing body 70 operated by the operator has dragged the second two-screen button 230B, which has been projected on the right end of the first projection screen 210 in the state shown in FIG. 7A, to move the second two-screen button 230B beyond the predetermined distance as shown in FIG. 7B through FIG. 7F.

Firstly, the control section 80 draws (step S122) the guide line 240, which is a boundary line indicating the position defining the boundary between the first projection screen 210 and the second projection screen 220, in a vertical direction at a central position in the horizontal direction of the second two-screen button 230B in the first projection screen 210.

It should be noted that in the case in which the two-screen button 230 is clicked and dragged, the guide line 240 moves following the two-screen button 230 which moves. Further, the two-screen button 230 can move on the guide line 240 in the vertical direction.

Then, the control section 80 draws (step S124) the indication line 250 in accordance with the position of the second two-screen button 230B in motion. In other words, the control section 80 projects the first projection screen 210 added with the indication line 250 at a division position nearest to the position of the guide line 240.

Figure 7B:
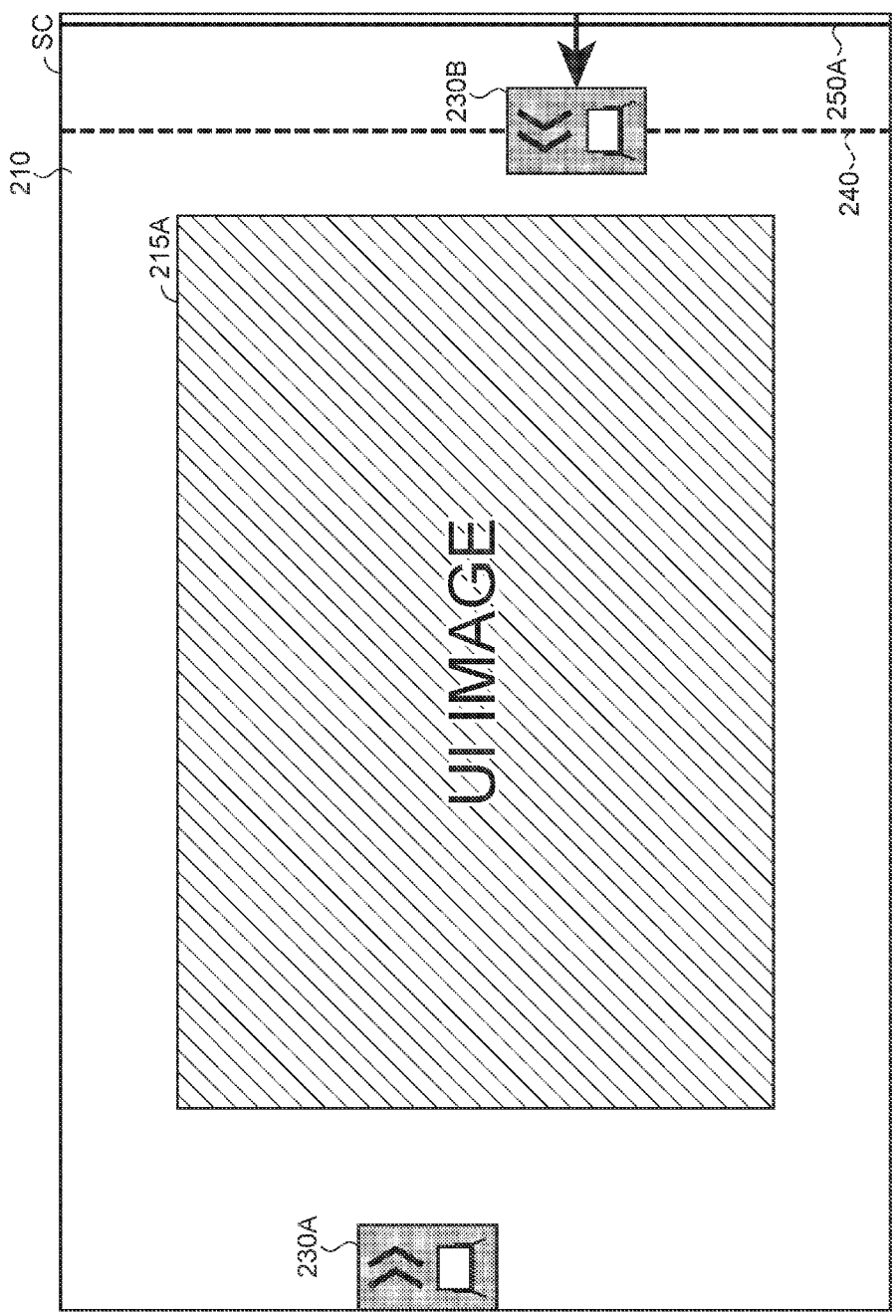
FIG. 7B is a diagram showing move of a guide line in the first projection screen due to the external input mode.

In the case in which the second two-screen button 230B is located at the position shown in FIG. 7B, therefore, the second two-screen button 230B is located on the right side of the branching position (1120) between the fourth indication line 250B and the fifth indication line 250A. Therefore, the control section 80 draws the fifth indication line 250A.

Then, the control section 80 determines (step S126) whether or not the second two-screen button 230B has been released.

Here, in the case in which the second two-screen button 230B has not been released (No in the step S126), the process is terminated. In this case, after a predetermined time elapses, the drag process (step S120) of the two-screen button 230 is performed again.

Figure 7C:
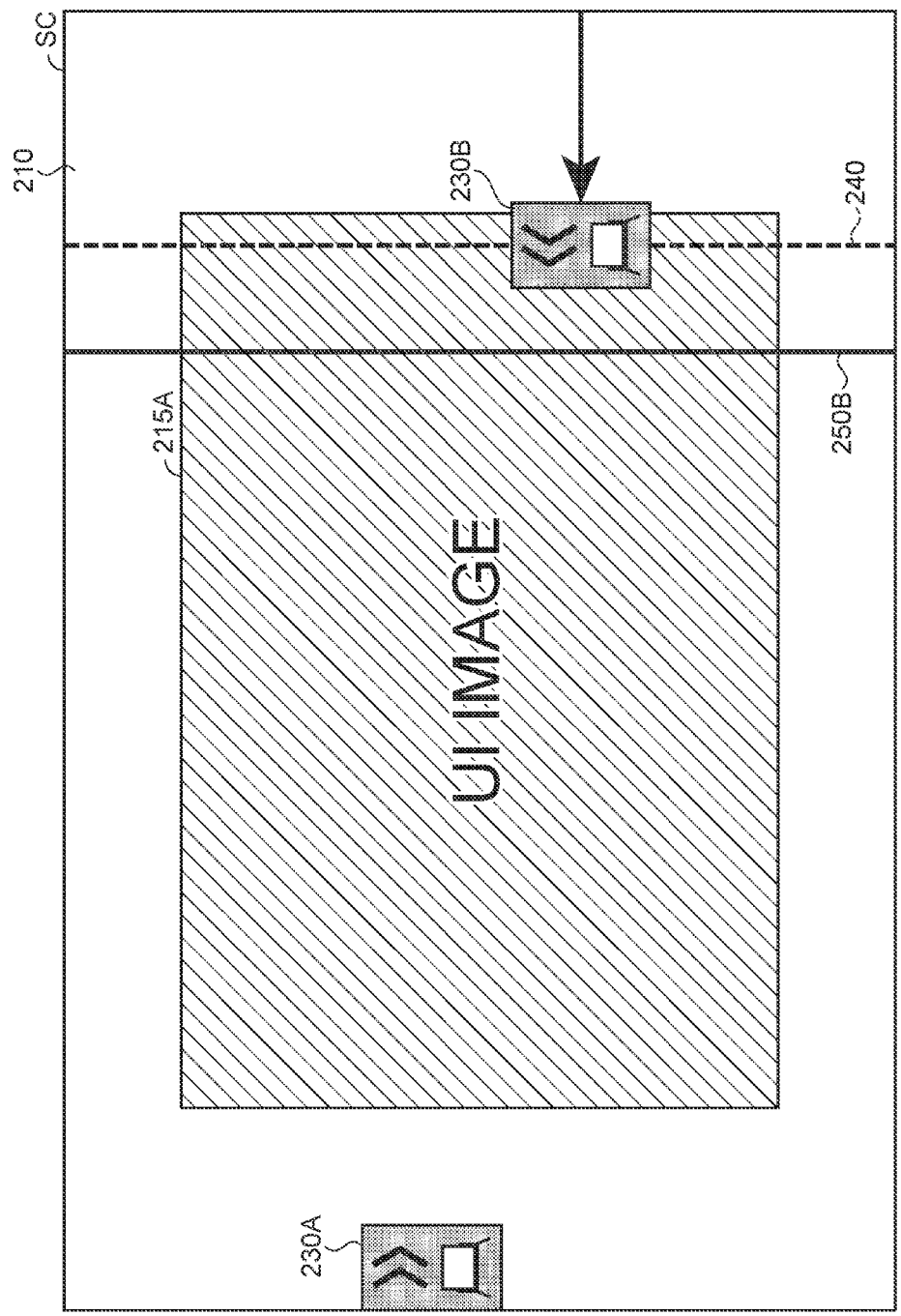
FIG. 7C is a diagram showing move of the guide line in the first projection screen due to the external input mode.

For example, in the case in which the second two-screen button 230B further moves leftward while being clicked, and is then located on the left side of the branching position (1120) between the fourth indication line 250B and the fifth indication line 250A as shown in FIG. 7C, the control section 80 draws the fourth indication line 250B instead of the fifth indication line 250A.

Further, in the case in which the second two-screen button 230B further moves leftward while being clicked, and is then located on the right side of the branching position (480) between the second indication line 250D and the third indication line 250C as shown in FIG. 7D, the control section 80 draws the third indication line 250C.

Figure 7E:
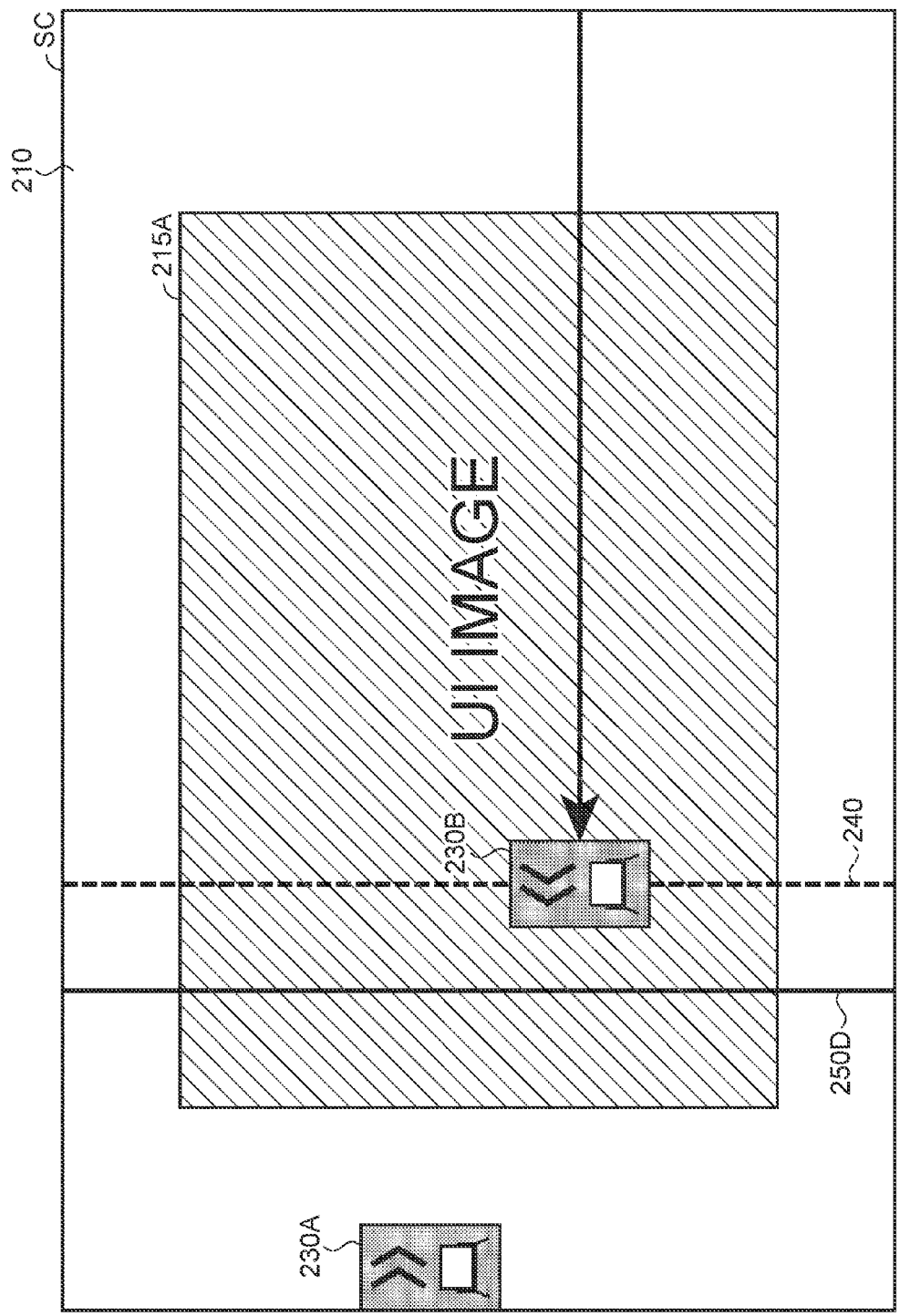
FIG. 7E is a diagram showing move of a guide line in the first projection screen due to the external input mode.

Further, in the case in which the second two-screen button 230B further moves leftward while being clicked, and is then located on the left side of the branching position (480) between the second indication line 250D and the third indication line 250C as shown in FIG. 7E, the control section 80 draws the second indication line 250D.

Figure 7F:
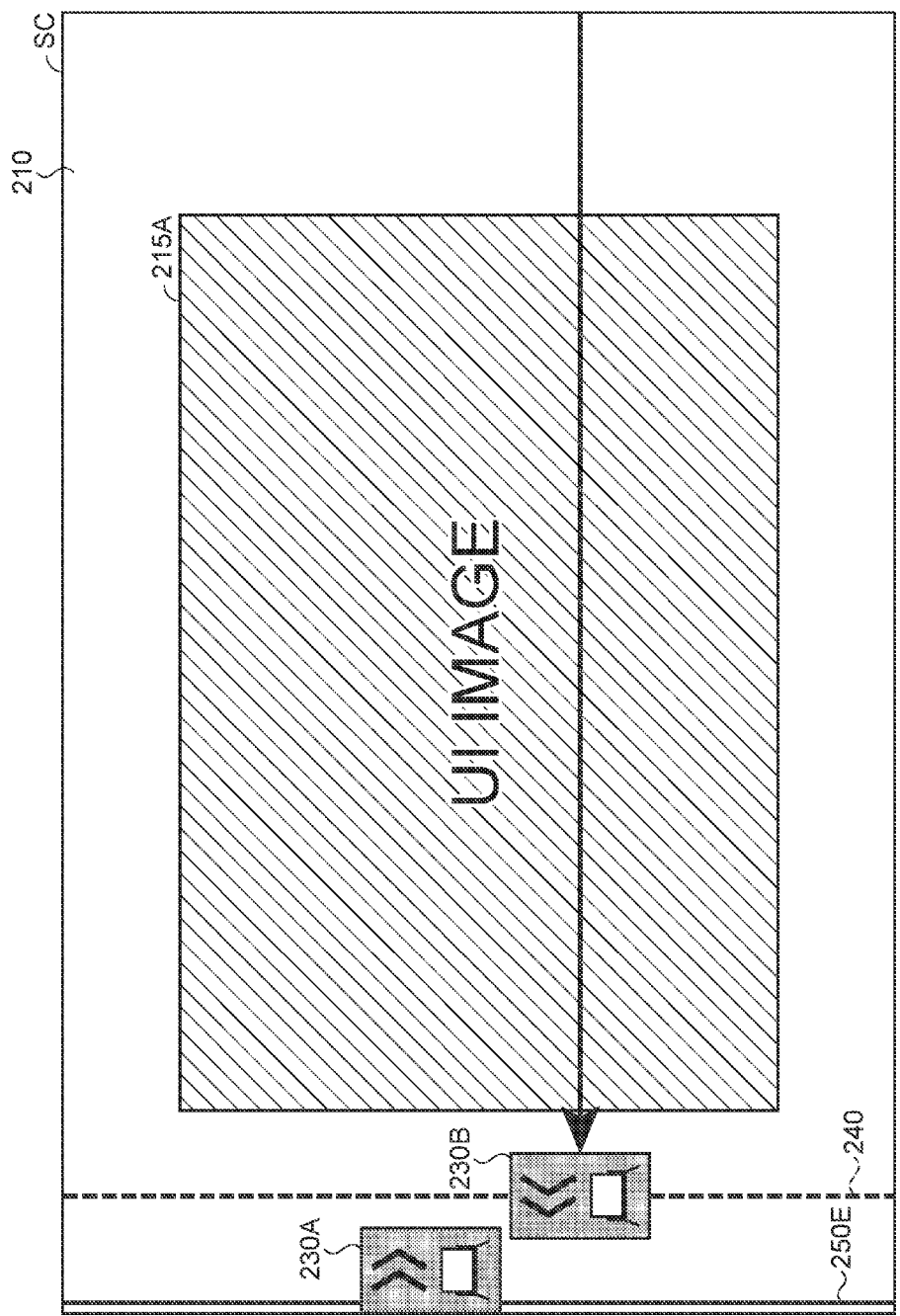
FIG. 7F is a diagram showing move of a guide line in the first projection screen due to the external input mode.

Further, in the case in which the second two-screen button 230B further moves leftward while being clicked, and is then located on the left side of the branching position (160)

between the first indication line 250E and the second indication line 250D as shown in FIG. 7F, the control section 80 draws the first indication line 250E.

Going back to FIG. 4, in the step S126, in the case in which the second two-screen button 230B is released (Yes in the step S126), the control section 80 erases (step S128) the guide line 240 and the indication line 250 thus drawn.

Then, the control section 80 determines (step S130) whether or not the position of the indication line 250 thus erased is either one of the left end or the right end of the first projection screen 210.

Here, in the case in which the position of the indication line 250 thus erased is either one of the left end and the right end of the first projection screen 210 (Yes in the step S130), the control section 80 displays (step S134) only the present external input mode in the one-screen display, and then terminates the process.

For example, in the case in which the second two-screen button 230B has been released in the state shown in FIG. 7B, the control section 80 projects the first projection screen 210 on the screen SC as shown in FIG. 7A.

Figure 8D:
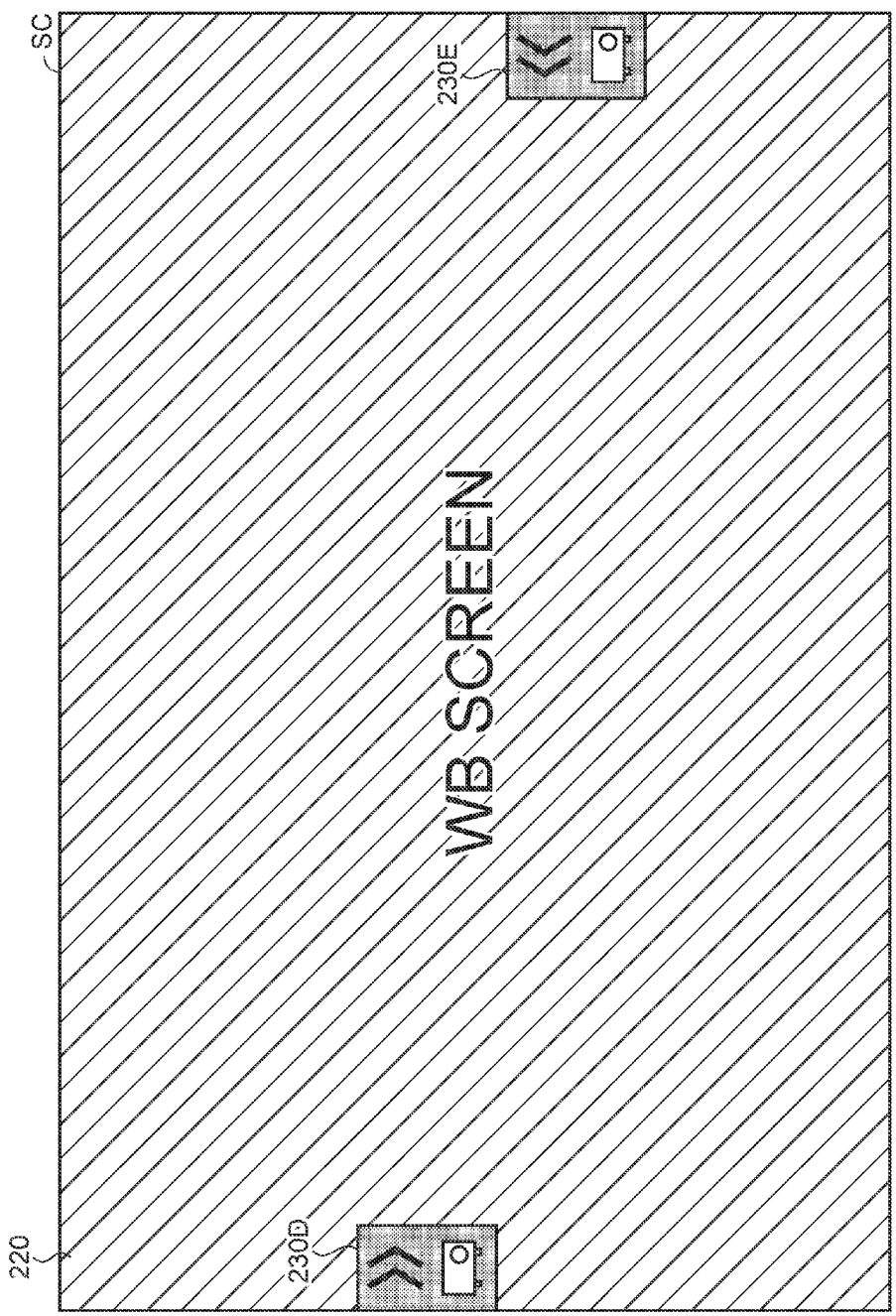
FIG. 8D is a diagram showing an example of performing projection with a single screen.

Further, in the case in which the second two-screen button 230B has been released in the state shown in FIG. 7F, the control section 80 projects the second projection screen 220 on the screen SC as shown in FIG. 8D.

The second projection screen 220 shown in FIG. 8D is a screen obtained by projecting the image (the second image) generated based on the image signal (the second image signal) output by the WB function section 16 on the screen SC.

It should be noted that in the present embodiment, in the case in which the second projection screen 220 is displayed in the one-screen display, a fourth two-screen button 230D is displayed in the left end part, and a fifth two-screen button 230E is displayed in the right end part.

On the other hand, in the case in which the position of the indication line 250 thus erased is neither the left end nor the right end of the first projection screen 210 (No in the step S130), the control section 80 displays (step S132) the two screens with the size corresponding to the position of the indication line 250, and then terminates the process.

For example, in the case in which the second two-screen button 230B has been released in the state in which the fourth indication line 250B is displayed as shown in FIG. 7C, the control section 80 projects the first projection screen 210 and the second projection screen 220 on the screen SC dividing the screen SC into two parts so as to achieve the left-expansion size shown in FIG. 8A.

Further, in the case in which the second two-screen button 230B has been released in the state in which the third indication line 250C is displayed as shown in FIG. 7D, the control section 80 projects the first projection screen 210 and the second projection screen 220 on the screen SC dividing the screen SC into two parts so as to achieve the same size shown in FIG. 8B.

Further, in the case in which the second two-screen button 230B has been released in the state in which the second indication line 250D is displayed as shown in FIG. 7E, the control section 80 projects the first projection screen 210 and the second projection screen 220 on the screen SC dividing the screen SC into two parts so as to achieve the right-expansion size shown in FIG. 8C.

It should be noted that in the present embodiment, there is described the case in which the second two-screen button 230B is moved leftward from the right end while being clicked, but the description of the case in which the first two-screen button 230A is moved rightward from the left end while being clicked is omitted since the flow of the process of the control section 80 controlling the projection is the same in this case.

Further, the drag process (step S120) of the two-screen button 230 described above is not limited to the configuration of starting from the one-screen display as shown in FIG. 7A, but it is also possible to assume the configuration of starting from the state in which the dual-partitioning display of the first projection screen 210 including the UI image 215C and the second projection screen 220 is performed in the same size.

Figure 9A:
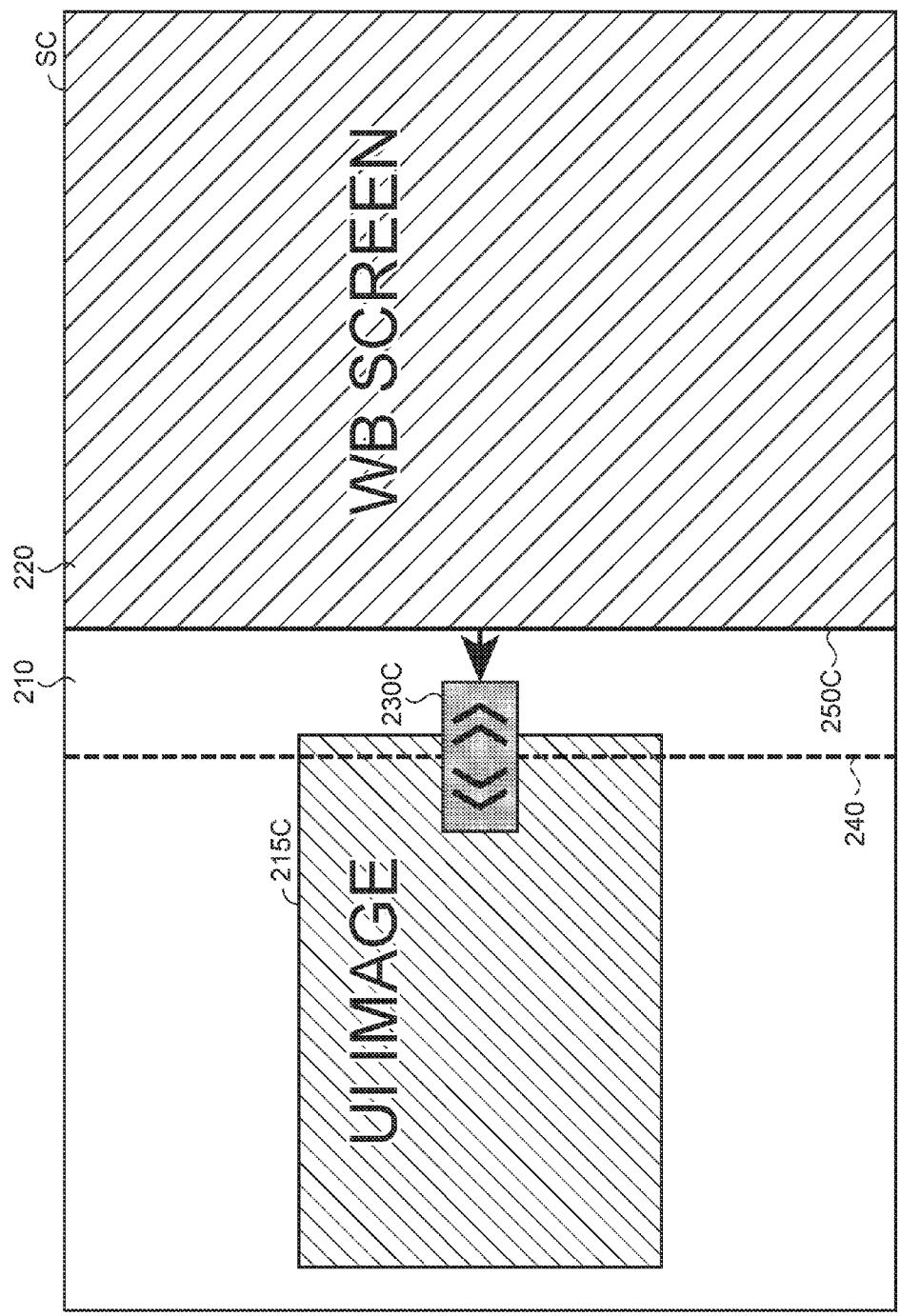
FIG. 9A is a diagram showing move of the guide line from a state of performing the dual-partitioning display.

For example, in the case in which the third two-screen button 230C moves leftward while being clicked, and is then located on the right side of the branching position (480) between the second indication line 250D and the third indication line 250C as shown in FIG. 9A, the control section 80 draws the third indication line 250C.

Figure 9B:
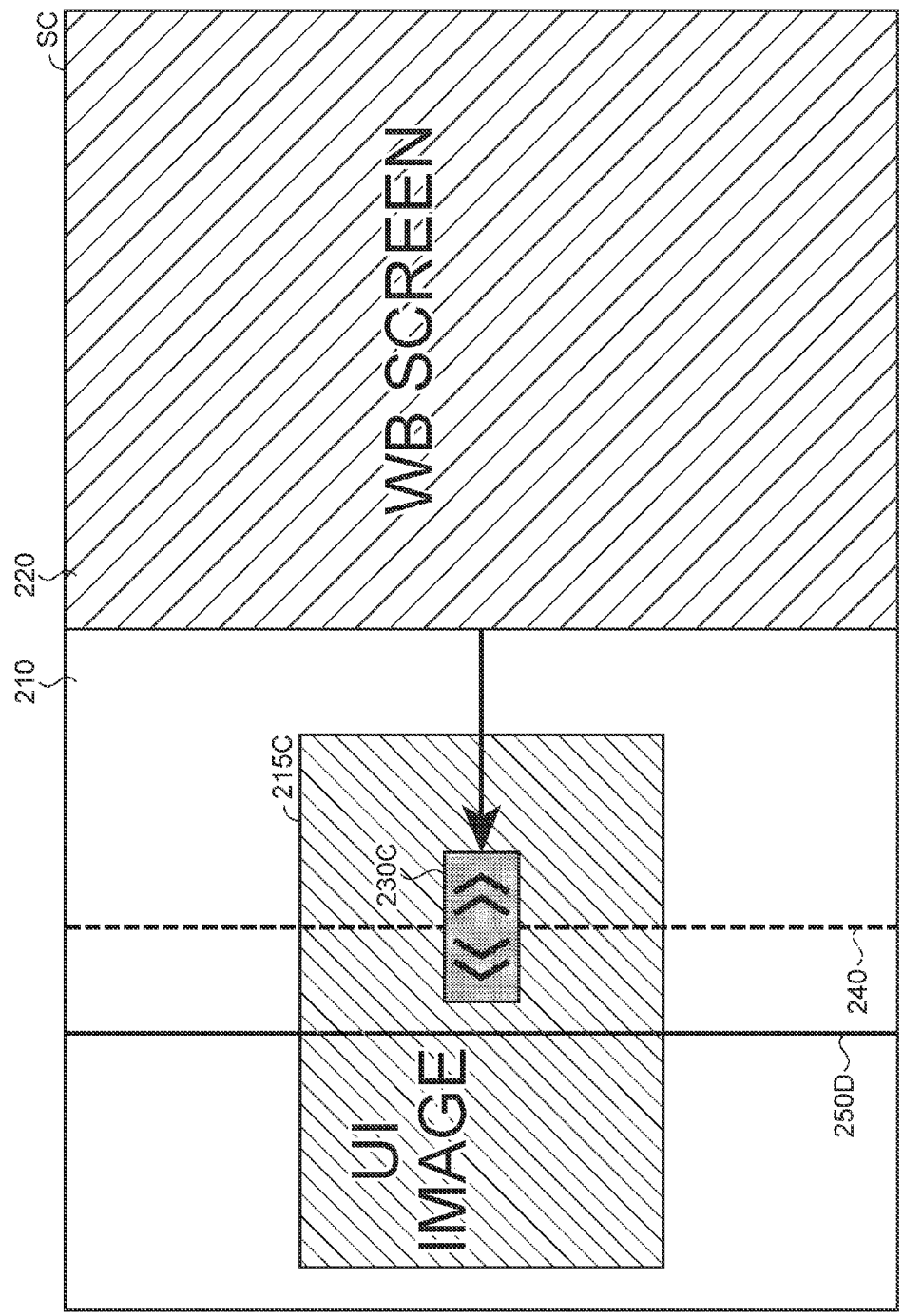
FIG. 9B is a diagram showing move of the guide line from the state of performing the dual-partitioning display.

Further, in the case in which the third two-screen button 230C moves leftward while being clicked, and is then located on the left side of the branching position (480) between the second indication line 250D and the third indication line 250C as shown in FIG. 9B, the control section 80 draws the second indication line 250D instead of the third indication line 250C.

Figure 9C:
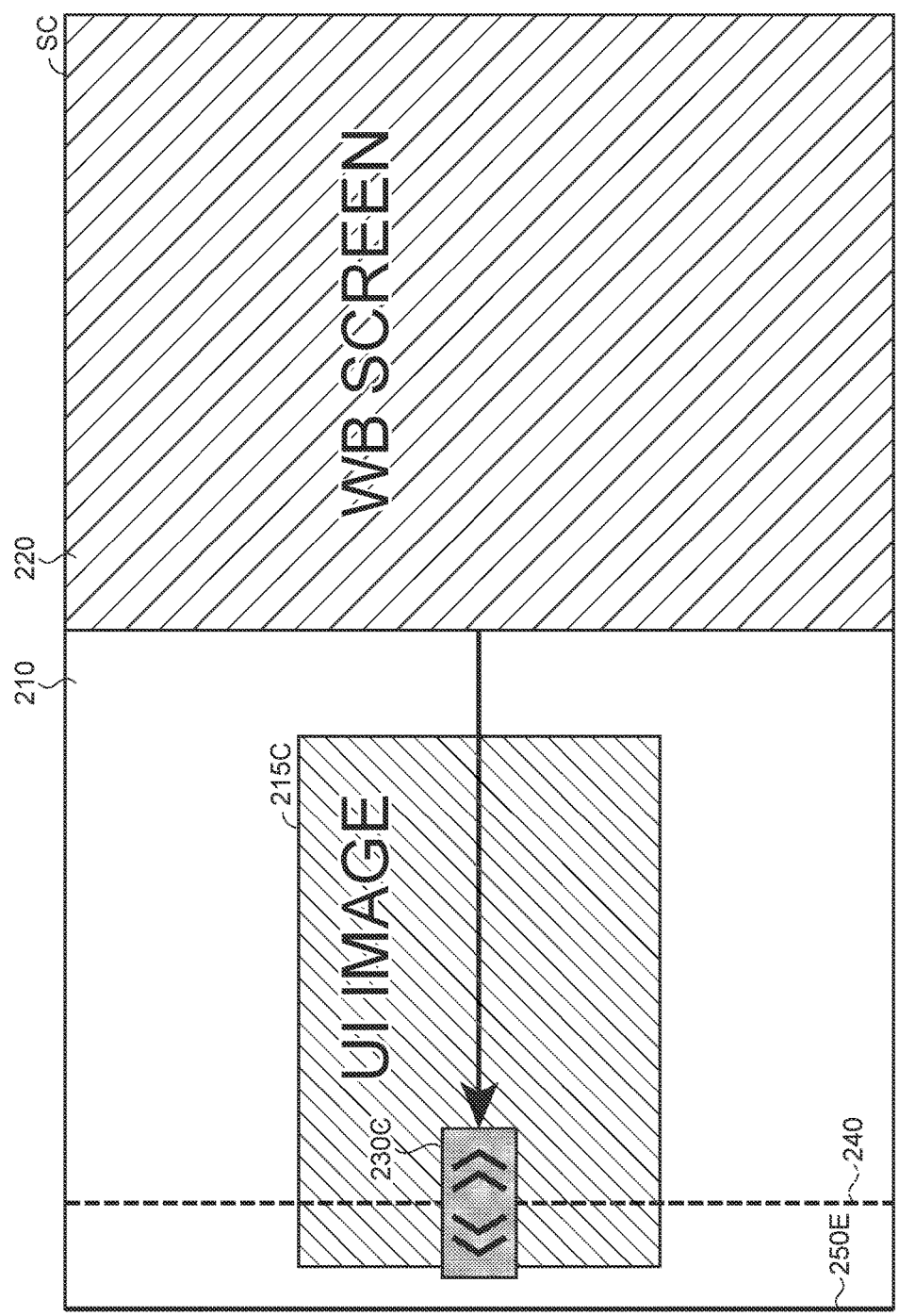
FIG. 9C is a diagram showing move of the guide line from the state of performing the dual-partitioning display.

Further, in the case in which the third two-screen button 230C further moves leftward while being clicked, and is then located on the left side of the branching position (160) between the first indication line 250E and the second indication line 250D as shown in FIG. 9C, the control section 80 draws the first indication line 250E instead of the second indication line 250D.

FIG. 5 is a flow chart showing the flow of the process of the releasing process (step S140) of the third two-screen button 230C displayed in the case in which two screens have been displayed.

Firstly, as shown in FIG. 8C, the control section 80 determines (step S142) whether or not the position where the third two-screen button 230C is drawn is located on the second indication line 250D.

Here, in the case in which the position where the third two-screen button 230C is drawn is located on the second indication line 250D (Yes in the step S142), the control section 80 performs the one-screen display as shown in FIG. 8D in the case of moving leftward, or performs the dual-partitioning display with the third indication line 250C as shown in FIG. 8B in the case of moving rightward (step S146), and then terminates the process.

On the other hand, in the case in which the position where the third two-screen button 230C is drawn is not located on the second indication line 250D (No in the step S142), the control section 80 determines (step S148) whether or not the position where the third two-screen button 230C is drawn is located on the (n−2)-th indication line 250.

Here, in the case in which the position where the third two-screen button 230C is drawn is located on the (n−2)-th indication line 250 (Yes in the step S148), the control section 80 performs the dual-partitioning display with the (n−3)-th indication line 250 in the case of moving leftward, or performs the dual-partitioning display with the (n−1)-th indication line 250 in the case of moving rightward (step S150), and then terminates the process.

On the other hand, in the case in which the position where the third two-screen button 230C is drawn is not located on the (n−2)-th indication line 250 (No in the step S148), the control section 80 performs the dual-partitioning display with the (n−2)-th indication line 250 in the case of moving leftward, or performs the one-screen display in the case of moving rightward, and then terminates the process.

Although in the process described hereinabove, the two-screen button 230 is clicked and then dragged with the pointing body 70, and is then released at the desired position to thereby draw the guide line 240 and the indication line 250 and switch between the one-screen display and the dual-partitioning display, the invention is not limited to this method.

For example, in the case in which the dual-partitioning display is performed with the fourth indication line 250B as shown in FIG. 8A, if the control section 80 detects a single click of the right side part of the third two-screen button 230C, the control section 80 makes the transition to the one-screen display in the external input mode as shown in FIG. 7A.

On the other hand, if the control section 80 detects a single click of the left side part of the third two-screen button 230C, the control section 80 makes the transition to the state in which the screen is divided into two parts with the third indication line 250C located on the left side as shown in FIG. 8B.

Similarly, if the control section 80 detects a single click of the left side part of the third two-screen button 230C in FIG. 8B, the control section 80 makes the transition to the state in which the screen is divided into two parts with the second indication line 250D located on the left side as shown in FIG. 8C.

Further, if the control section 80 detects a single click of the left side part of the third two-screen button 230C in FIG. 8C, the control section 80 makes the transition to the one-screen display in the WB mode as shown in FIG. 8D.

As described above, the control section 80 moves the boundary line to the first division position (the indication line 250) adjacent to the indication line 250 indicating the current division position in accordance with the click of the two-screen button 230.

Figure 10:
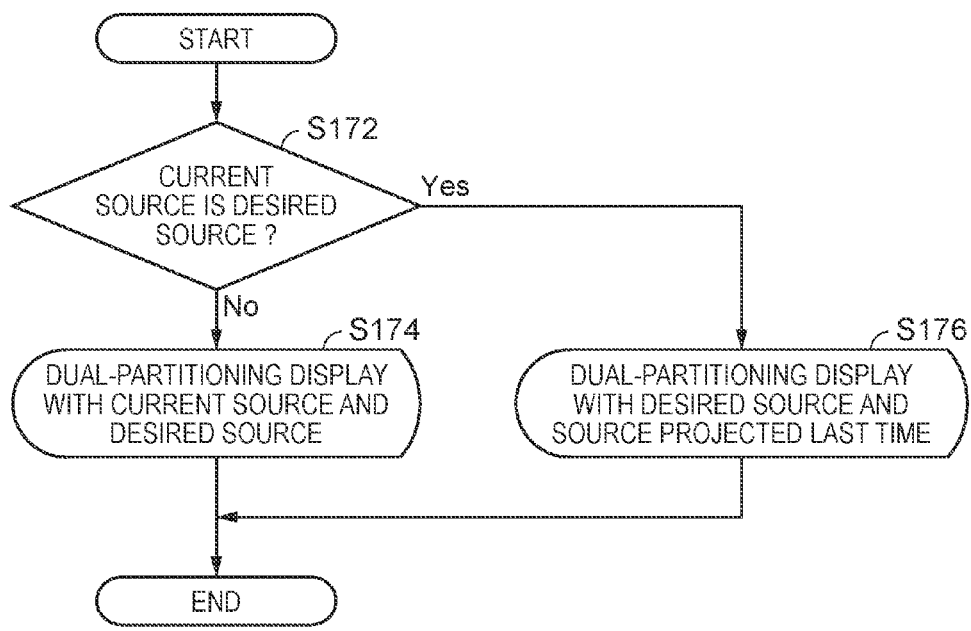
FIG. 10 is a flowchart showing the flow of a process of determining the sources displayed in the case of performing the dual-partitioning display.

FIG. 10 is a flowchart showing the flow of a process of determining the sources displayed in the case of performing the dual-partitioning display.

Firstly, the control section 80 determines (step S172) whether or not the current source displayed in the one-screen display is the desired source. Although in the present embodiment, the input source in the WB mode is assumed as the desired source, the invention is not limited to this example. It is also possible to assume the configuration in which the desired source is changed in accordance with the setting of the user.

Here, the current source displayed in the one-screen display is the desired source (Yes in the step S172), the control section 80 obtains the information related to the source projected before the desired source is projected, namely the source projected last time, then performs (step S176) the dual-partitioning display with the desired source and the source projected last time respectively displayed in the right and left parts of the screen SC, and then terminates the process. It should be noted that it is also possible to store the information related to the source projected last time in the storage section 85.

On the other hand, in the case in which the current source displayed in the one-screen display is not the desired source (No in the step S172), the control section 80 performs (step S174) the dual-partitioning display with the current source and the desired source respectively displayed in the right and left parts of the screen SC, and then terminates the process.

In the present embodiment, in the case in which the one-screen display with the second projection screen 220 corresponding to the WB mode is selected as shown in FIG. 8D, by clicking the fourth two-screen button 230D or the fifth two-screen button 230E and move it in the horizontal direction, it is possible to perform the dual-partitioning display with the first projection screen 210 of another source (e.g., the external input mode) and the second projection screen 220. In such a case, it is possible for the projector 10 to set the direction of an area of the second projection screen 220 displayed in priority.

Figure 11:
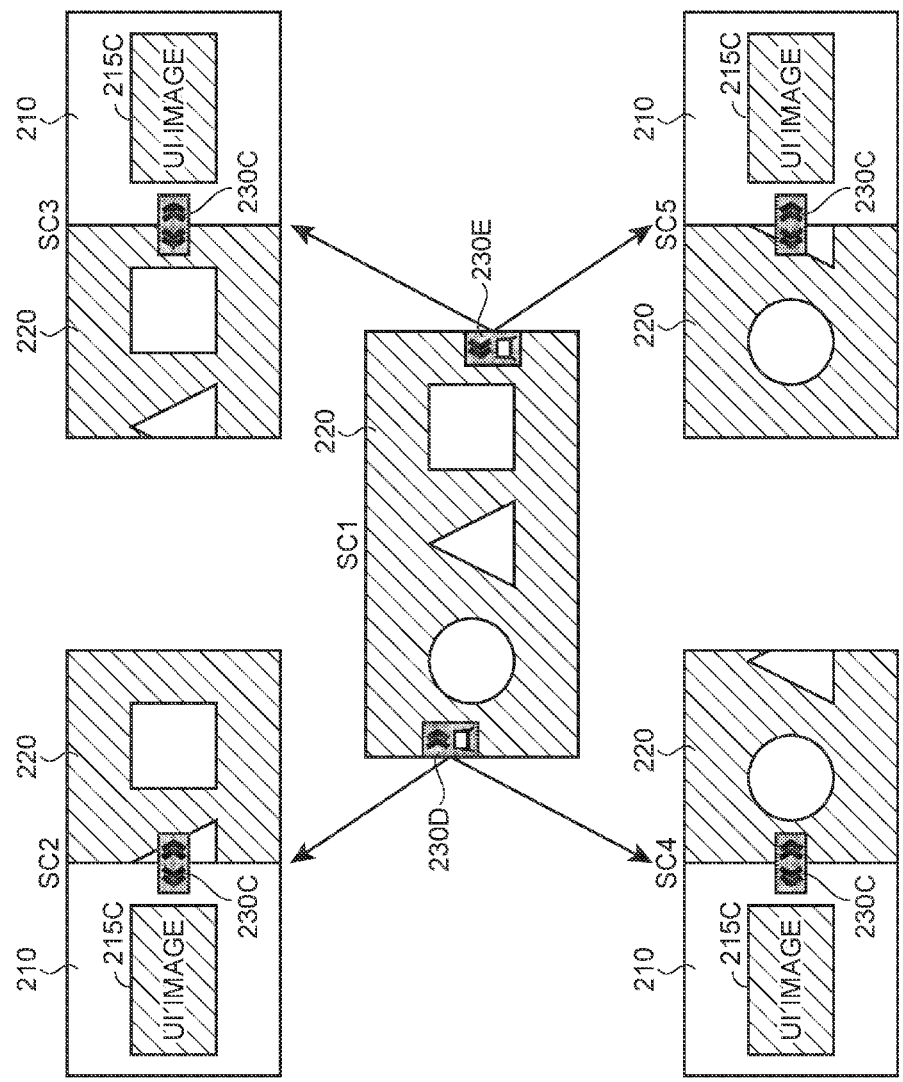
FIG. 11 is a diagram for explaining the direction of displaying a second projection screen.

FIG. 11 is a diagram for explaining the direction of the area of the second projection screen 220 displayed in priority. It is possible for the operator to set either one of a "left direction," a "right direction," and "no direction setting" using the direction as an area of the second projection screen 220 to be displayed in priority. The information related to the display direction set can also be stored in the storage section 85.

Firstly, there is described the case in which the "left direction" is set. The screen image SC1 shows the state in which the operator operates the pointing body 70 to perform drawing on the second projection screen 220 displayed in the one-screen display.

Here, in the case in which the operator clicks the fourth two-screen button 230D and moves the button rightward with the pointing body 70, the control section 80 moves the second projection screen 220 rightward in the state of displaying the left side area of the second projection screen 220 in priority, and displays the first projection screen 210 on the left side in accordance with the size of the space created by the move of the second projection screen 220 as in the screen image SC4.

Further, in the case in which the operator clicks the fifth two-screen button 230E and moves the button leftward with the pointing body 70, the control section 80 moves the left end part of the first projection screen 210 leftward in the state of displaying the left side area of the second projection screen 220 in priority, and displays the first projection screen 210 on the right side in accordance with the size of the area in which the left end part of the first projection screen 210 has moved as in the screen image SC5.

Then, there is described the case in which the "right direction" is set.

Similarly to the "left direction," in the case in which the operator clicks the fourth two-screen button 230D and moves the button from the state of the screen image SC1 rightward with the pointing body 70, the control section 80 moves only the left end part rightward in the state of displaying the right side area of the second projection screen 220 in priority, and displays the first projection screen 210 on the left side in accordance with the size of the area determined by the move of the left end part of the second projection screen 220 as in the screen image SC2.

Further, in the case in which the operator clicks the fifth two-screen button 230E and moves the button leftward with the pointing body 70, the control section 80 moves the second projection screen 220 leftward in the state of displaying the right side area of the second projection screen 220 in priority, and displays the first projection screen 210 on the right side in accordance with the size of the space created by the move as in the screen image SC3.

By setting the "right direction" or the "left direction" described above, it is useful in the case of making an additional description such as a memorandum on the right side or the left side of the second projection screen 220 by the WB mode.

Further, in the case in which the "no direction setting" is set, when the operator clicks the fourth two-screen button 230D and moves the button from the state of the screen image SC1 rightward with the pointing body 70, the control section 80 moves only the left end part rightward in the state of displaying the second projection screen 220, and displays the first projection screen 210 by overwriting the first projection screen 210 on the left side of the second projection screen 220 in accordance with the size of the area determined by the move of the left end part of the second projection screen 220 as in the screen image SC2.

Further, in the case in which the operator clicks the fifth two-screen button 230E and moves the button leftward with the pointing body 70, the control section 80 moves only the right end part leftward in the state of displaying the second projection screen 220, and displays the first projection screen 210 by overwriting the first projection screen 210 on the right side of the second projection screen 220 in accordance with the size of the area determined by the move of the right end part of the second projection screen 220 as in the screen image SC5.

It should be noted that the GUI generation section 50 generates the two-screen button 230 based on the data stored in the storage section 85. On this occasion, the GUI generation section 50 determines the icon to be displayed in the two-screen button 230 in accordance with the display configuration, namely the one-screen display and the dual-partitioning display. For example, in the case of the one-screen display in the WB mode shown in FIG. 8D, the GUI generation section 50 adopts an icon corresponding to the input source (e.g., the external input mode) newly displayed by moving the two-screen button 230. Further, in the case of the one-screen display in the external input mode shown in FIG. 7A, the GUI generation section 50 adopts an icon corresponding to the WB mode newly displayed by moving the two-screen button 230.

It should be noted that in the case in which there is a plurality of selectable input sources, it is also possible that the GUI generation section 50 generates the two-screen buttons 230 including the icons corresponding respectively to the input sources, the control section 80 arranges the plurality of two-screen buttons 230 thus generated side by side in the second projection screen 220 and displays the plurality of two-screen buttons 230 so as to be selected by the pointing body 70.

Figure 12:
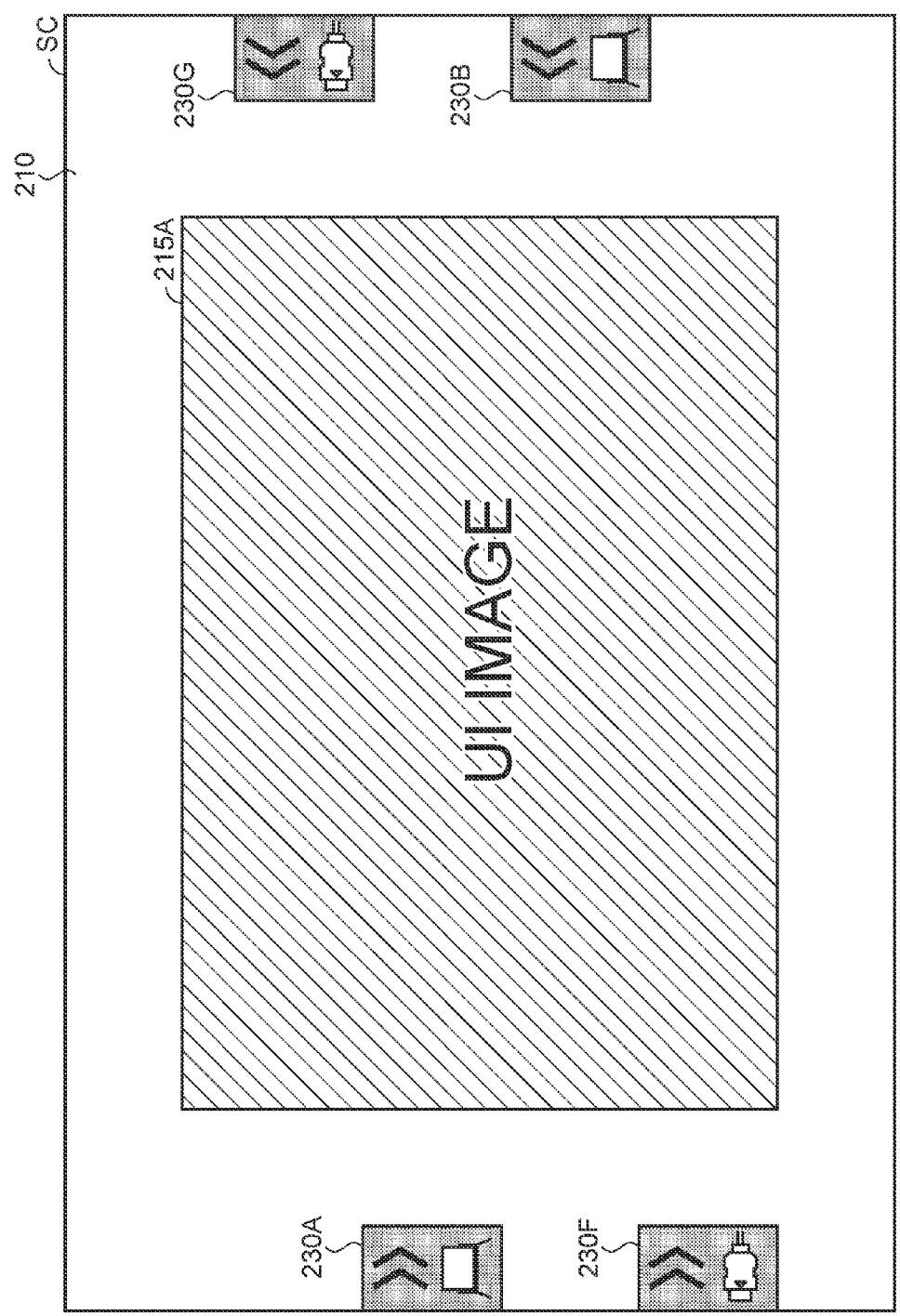
FIG. 12 is a diagram showing the first projection screen on which a plurality of pointing areas is displayed.

For example, in the case in which the WB mode (the first source) and the computer system (the second source) connected to the input terminal other than the input terminal to which the computer system outputting the image signal forming the basis of the image currently displayed in the first projection screen 210 can be selected as the selectable input sources in the case of the one-screen display in the external input mode as shown in FIG. 7A, it is also possible to display a sixth two-screen button 230F and a seventh two-screen button 230G (a second pointing area) including an icon corresponding to a computer system (or an input terminal to which the computer system is connected) other than the computer system outputting the image signal forming the basis of the image currently displayed in the first projection screen 210 in addition to the first two-screen button 230A and the second two-screen button 230B (a first pointing area) including the icon corresponding to the WB mode as shown in FIG. 12.

According to the embodiment described hereinabove, the following advantages can be obtained.

1. By the operator gripping the pointing body 70 and clicking and moving the two-screen button 230, which is projected on the screen SC by the projector 10, using the pointing body 70, the indication line 250 indicating the position where the screen SC can be divided is displayed in accordance with the position of the two-screen button thus moved, and by releasing the pointing body 70 therefrom, two-screen display is performed with the two input sources taking the indication line 250 displayed as the division position. Therefore, it is possible for the operator to easily set the division position for the two-screen display to thereby perform the two-screen display divided at the desired division position.

2. Since the division position for the two-screen display is changed every time the two-screen button 230 is clicked with the pointing body 70, it is possible for the operator to easily change the division position for the two-screen display.

3. In the case in which the projector 10 performs the two-screen display, an image by the desired source is projected in one of the two screens. Therefore, it is possible for the operator to easily display the image by the desired source.

4. It is possible for the operator to set either one of the "left direction," the "right direction," and the "no direction setting" using the direction as an area of the second projection screen 220 to be displayed in priority. Therefore, it is possible for the operator to flexibly set the part to be displayed in priority in accordance with the content displayed in the second projection screen 220.

Although the invention is hereinabove described based on the embodiment shown in the drawings, the invention is not limited to the present embodiment, but such modified examples as described below can also be assumed.

1. In the case in which the two-screen button 230 is pointed in the state of the one-screen display to make the transition to the two-screen display, the control section 80 does not perform a signal discrimination process on the video signal from the input source currently displayed in the one-screen display as a main signal, but performs the signal discrimination process on the video signal to be added in the two-screen display as a sub-signal, and then performs switching. Thus, it is possible to prevent the picture from the input source displayed in the one-screen display from flickering to degrade the visibility.

2. As the projector 10, there is adopted the short-focus type, which is disposed immediately above the screen SC, and projects an image obliquely downward, but the projector is not limited to this type providing the interactive function can be realized. For example, a long-focus type to be disposed so as to be opposed to the screen SC can also be adopted.

3. In the case of performing the two-screen display, there is assumed the configuration of disposing the two screens in the horizontal direction with respect to the screen SC, but it is possible to assume a configuration of disposing the two screens in the vertical direction. Further, a configuration in which the operator designates the arrangement direction can also be assumed. Further, the division is not limited to the division into two screens, but can also be division into three or more screens.

4. Although the description is presented citing the configuration, in which the three transmissive liquid crystal panels corresponding respectively to the colors of R, G, and B are used, as an example of the light modulation device 94, the light modulation device 94 is not limited to this example. For example, it is also possible to adopt a configuration of using three reflective liquid crystal panels, or to use a system having a liquid crystal panel and a color wheel combined with each other. Alternatively, the light modulation device 94 can be constituted by a system using three digital mirror devices (DMD), a DMD system having a single digital mirror device and a color wheel combined with each other, or the like. In the case of using just one liquid crystal panel or DMD as the light modulation device, the member corresponding to the combining optical system such as the cross dichroic prism is unnecessary. Further, besides the liquid crystal panel or the DMD, any light modulation device capable of modulating the light emitted by the light source can be adopted.

Further, the device for achieving the method described above can be realized by a single device in some cases, or can also be realized by combining a plurality of devices with each other, and therefore, a variety of configurations are included.

Further, each of the functional sections of the image processing system shown in FIG. 2 is for showing the functional configuration realized by the cooperation of hardware and software, and the specific installation configuration is not particularly limited. Therefore, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiment described above can also be realized by hardware, or a part of the function realized by hardware can also be realized by software.

What is claimed is:

1. A display device comprising:
   a processor programmed to:
      generate a composite image including a first image based on a first image signal, a second image based on a second image signal, and a boundary line indicating a position to be a boundary between the first image and the second image;
      display the generated composite image on a display surface;
      detect a position of a pointing body with respect to the display surface;
      generate the composite image with the boundary line moved based on the detected position of the pointing body, such that relative sizes of the first image and the second image displayed on the display surface are changed based on the detected position of the pointing body; and
      in response to detecting movement of the boundary line to a predetermined position, switch a display state of at least one of the first image and the second image between a first state of being displayed on the display surface and a second state of not being displayed on the display surface.

2. The display device according to claim 1, wherein the processor is programmed to generate the composite image added with an indication line at a division position the closest to the boundary line out of a plurality of division positions where the first image and the second image can be separated from each other in the composite image.

3. The display device according to claim 2, wherein the processor is programmed to:
   in a case in which the composite image is generated having a pointing area, which can be pointed by the pointing body and is superimposed on the boundary, detect that the pointing area of the composite image displayed on the display surface is clicked by the pointing body; and
   move the boundary line of the composite image to a first division position adjacent to the boundary out of the plurality of division positions.

4. The display device according to claim 3, wherein the pointing area is moved along the boundary line.

5. The display device according to claim 2, wherein the processor is programmed to:
   in a case in which the first image signal is input from a first input source, display the first image on the display surface, and not display the second image on the display surface; and
   in response to detecting that the boundary line moves to a position other than an end part, generate the composite image, which includes the second image based on the second image signal input from a second input source different from the first input source, based on the boundary line moved.

6. The display device according to claim 5, wherein the processor is programmed to perform a signal discrimination process on the second image signal without performing the signal discrimination process on the first image signal.

7. The display device according to claim 5, wherein the processor is programmed to:
   in a case in which the second input source can be selected from a plurality of sources including a first source and a second source, generate the composite image provided with a first pointing area corresponding to the first source and a second pointing area different from the first pointing area and corresponding to the second source.

8. The display device according to claim 5, wherein the processor is programmed to:
   in a case of disposing the second image in an area of the composite image where the first image has been disposed based on the boundary, determine an area of the first image displayed in priority based on information having been set.

9. The display device according to claim 1, wherein the processor is programmed to:
   move the boundary line from a first boundary line position to a second boundary line position in response to detecting movement of the pointing body from a first position associated with the first boundary line position to a second position associated with the second boundary line position.

10. The display device according to claim 1, wherein the processor is programmed to:
    move the boundary line from a first boundary line position to a second boundary line position in response to detecting the pointing body on a first area on the display surface; and
    move the boundary line from the first boundary line position to a third boundary line position different from the second boundary line position in response to detecting the pointing body on a second area on the display surface.

11. A method of controlling a display device, comprising:
    generating a composite image including a first image based on a first image signal, a second image based on a second image signal, and a boundary line indicating a position to be a boundary between the first image and the second image;
    displaying the composite signal having been generated on a display surface;
    detecting a position of a pointing body with respect to the display surface;

generating the composite image with the boundary line moved based on the position of the pointing body having been detected, such that relative sizes of the first image and the second image displayed on the display surface are changed based on the detected position of the pointing body; and in response to detecting movement of the boundary line to a predetermined position, switching a display state of at least one of the first image and the second image between a first state of being displayed on the display surface and a second state of not being displayed on the display surface.

12. The method of controlling the display device according to claim 11, wherein the boundary line is moved from a first boundary line position to a second boundary line position in response to detecting movement of the pointing body from a first position associated with the first boundary line position to a second position associated with the second boundary line position.

13. The method of controlling the display device according to claim 11, wherein the boundary line is moved from a first boundary line position to a second boundary line position in response to detecting the pointing body on a first area on the display surface, and the boundary line is moved from the first boundary line position to a third boundary line position different from the second boundary line position in response to detecting the pointing body on a second area on the display surface.

* * * * *